United States Patent
Hwang et al.

(10) Patent No.: US 9,768,999 B2
(45) Date of Patent: *Sep. 19, 2017

(54) APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

(71) Applicant: LG ELECTRONICS INC., Seoul (KR)

(72) Inventors: Jaeho Hwang, Seoul (KR); Sungryong Hong, Seoul (KR); Woosuk Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/044,879

(22) Filed: Feb. 16, 2016

(65) Prior Publication Data

US 2016/0164710 A1 Jun. 9, 2016

Related U.S. Application Data

(63) Continuation of application No. 14/444,660, filed on Jul. 28, 2014, now Pat. No. 9,294,322.

(Continued)

(51) Int. Cl.
*H04L 27/26* (2006.01)
*H04H 40/00* (2009.01)
(Continued)

(52) U.S. Cl.
CPC ......... *H04L 27/2627* (2013.01); *H04H 20/42* (2013.01); *H04H 40/00* (2013.01);
(Continued)

(58) Field of Classification Search
CPC ...... H04H 20/42; H04H 40/00; H04L 1/0057; H04L 27/2602; H04L 27/2605;
(Continued)

(56) References Cited

U.S. PATENT DOCUMENTS 8,279,990 B2 10/2012 Song ............... H04H 20/72
365/200
2006/0288117 A1* 12/2006 Raveendran ........ H04L 12/66
709/236

(Continued)

FOREIGN PATENT DOCUMENTS

EP 2071794 A1 6/2009
EP 2362653 A1 8/2011
(Continued)

OTHER PUBLICATIONS

Final draft ETSI EN 302 755 v1.3.1 (Nov. 2011), 189 pages.
(Continued)

*Primary Examiner* — Hirdepal Singh
(74) *Attorney, Agent, or Firm* — Dentons US LLP

(57) ABSTRACT

A method and an apparatus for transmitting broadcast signals thereof are disclosed. The method for transmitting broadcast signals includes processing input streams into BB frames in PLPs; encoding data of the PLPs; building at least one signal frame by mapping the encoded data of the PLPs; and modulating data in the built signal frame by OFDM method and transmitting the broadcast signals having the modulated data, wherein at least one of the BB frames includes a stuffing field and a first indicator describing whether the stuffing field is included in the BB frame.

12 Claims, 24 Drawing Sheets

Related U.S. Application Data

(60) Provisional application No. 61/859,298, filed on Jul. 29, 2013.

(51) Int. Cl.
*H04H 20/42* (2008.01)
*H04L 1/00* (2006.01)
*H04L 5/00* (2006.01)

(52) U.S. Cl.
CPC .......... *H04L 1/0057* (2013.01); *H04L 5/0044* (2013.01); *H04L 27/2602* (2013.01); *H04L 27/2605* (2013.01); *H04L 27/2649* (2013.01); *H04L 5/0023* (2013.01)

(58) Field of Classification Search
CPC ............. H04L 27/2627; H04L 27/2649; H04L 5/0023; H04L 5/0044
USPC .................................................. 375/295, 340
See application file for complete search history.

(56) References Cited

U.S. PATENT DOCUMENTS

| | | | |
|---|---|---|---|
| 2009/0083783 A1 | 3/2009 | Park et al. .................... 725/25 |
| 2010/0262708 A1 | 10/2010 | Bouazizi et al. ............. 709/231 |
| 2011/0044401 A1 | 2/2011 | Ko et al. ....................... 375/295 |
| 2011/0286535 A1* | 11/2011 | Ko .......................... H04L 1/0041 |
| | | | 375/259 |
| 2012/0014422 A1 | 1/2012 | Wegener |
| 2012/0155648 A1 | 6/2012 | Tupala ......................... 380/287 |
| 2012/0307842 A1* | 12/2012 | Petrov .............. H04N 21/23608 |
| | | | 370/474 |
| 2013/0039442 A1* | 2/2013 | Smallcomb ............. H04L 1/007 |
| | | | 375/308 |
| 2013/0250865 A1 | 9/2013 | Ryan ............................. 370/329 |
| 2014/0314103 A1* | 10/2014 | Michael ............... H04N 21/643 |
| | | | 370/472 |
| 2015/0036689 A1 | 2/2015 | Hwang ................... H04L 69/22 |
| | | | 370/392 |
| 2015/0106537 A1* | 4/2015 | Bobrek ..................... G06F 5/10 |
| | | | 710/54 |
| 2016/0134532 A1* | 5/2016 | Hwang ................... H04L 45/74 |
| | | | 370/392 |

FOREIGN PATENT DOCUMENTS

| | | |
|---|---|---|
| JP | 2002-325230 A | 11/2002 |
| WO | 2009031863 A2 | 3/2009 |
| WO | 2010082753 A2 | 7/2010 |

OTHER PUBLICATIONS

DVB Organization, "T2_0200 CfT response Teracom TFS_concept.pdf," DVB, Digital Video Broadcasting, Geneva, Switzerland, Jun. 2007, XP017817443, 73 pages.

* cited by examiner

Figure 5: Stream format at the output of the MODE ADAPTER, Normal Mode, GFPS and TS This 2-bits field indicates the status of Padding sub-zone 00  No Padding 01  1 byte Padding (No PADL field)

10  Padding equal or more than 2 bytes (2 bytes PADL field)

11  Reserved

FIG. 21

| STUFFI | Padding Type | Padding Size | In-band | 1st Byte | 2nd Byte | 3rd Byte |
|---|---|---|---|---|---|---|
| (#1) 0 | Data | . | . | data | data | data |
| (#2) 1 | Padding | 1byte | . | 1 1 1 1 1 1 1 1 | data | data |
| (#3) 1 | Padding | >1byte | . | 1 1 1 1 1 1 1 1 | LSB | Padding |
| (#4) 1 | Padding +In-band | >2byte | In-band A signaling | 0 0 1 MSB | LSB | In-band A data |
| (#5) 1 | Padding +In-band | >2byte | In-band B signaling | 0 1 0 MSB | LSB | In-band B data |
| (#6) 1 | Padding +In-band | >2byte | In-band A,B signaling | 0 0 0 MSB | LSB | In-band A,B data |

[PAD_ONE] 1bit Padding Indicator
[PAD_TYPE] Padding Type Signaling
[PAD_LEN] Padding Length

APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

This application is a Continuation of U.S. application Ser. No. 14/444,660, filed on Jul. 28, 2014, which claims the benefit of U.S. Provisional Application No. 61/859,298, filed on Jul. 29, 2013, all of which are hereby incorporated by reference in their entirety for all purposes as if fully set forth herein.

BACKGROUND OF THE INVENTION

Field of the Invention

The present invention relates to an apparatus for transmitting broadcast signals, an apparatus for receiving broadcast signals and methods for transmitting and receiving broadcast signals.

Discussion of the Related Art

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

SUMMARY OF THE INVENTION

Accordingly, the present invention is directed to an apparatus for transmitting broadcast signals and an apparatus for receiving broadcast signals for future broadcast services and methods for transmitting and receiving broadcast signals for future broadcast services.

An object of the present invention devised to solve the problem lies on an apparatus and method for transmitting broadcast signals to multiplex data of a broadcast transmission/reception system providing two or more different broadcast services in a time domain and transmit the multiplexed data through the same RF signal bandwidth and an apparatus and method for receiving broadcast signals corresponding thereto.

Another object of the present invention devised to solve the problem lies on an apparatus for transmitting broadcast signals, an apparatus for receiving broadcast signals and methods for transmitting and receiving broadcast signals to classify data corresponding to services by components, transmit data corresponding to each component as a data pipe, receive and process the data Another object of the present invention devised to solve the problem lies on an apparatus for transmitting broadcast signals, an apparatus for receiving broadcast signals and methods for transmitting and receiving broadcast signals to signal signaling information necessary to provide broadcast signals.

The object of the present invention can be achieved by providing a method of transmitting broadcast signals including processing input streams into BB (Base Band) frames in PLPs (Physical Layer Pipes); encoding data of the PLPs; building at least one signal frame by mapping the encoded data of the PLPs; and modulating data in the built signal frame by OFDM (Orthogonal Frequency Division Multiplexing) method and transmitting the broadcast signals having the modulated data, wherein at least one of the BB frames includes a stuffing field and a first indicator describing whether the stuffing field is included in the BB frame.

Preferably, the processing input streams further includes, generating data fields of the BB frames by using the input streams, and inserting BB frame headers to the BB frames.

Preferably, the BB frame further includes a second indicator indicating length of the stuffing field.

Preferably, the BB frame further includes a third indicator having information about composition of the BB frame.

Preferably, the information in the third indicator indicates a type of stuffing data in the stuffing field.

Preferably, the encoding data of the PLPs further includes, encoding the BB frames in the PLPs with LDPC (Low Density Parity Check) codes, bit interleaving the LDPC encoded data in the PLPs, mapping the bit interleaved data onto constellations, MIMO (Multi Input Multi Output) encoding the mapped data, and time interleaving the MIMO encoded data.

In another aspect of the present invention, provided herein is an method of receiving broadcast signals including receiving the broadcast signals having at least one signal frame and demodulating data in the at least one signal frame by OFDM (Orthogonal Frequency Division Multiplexing) method; parsing the at least one signal frame by demapping data of PLPs (Physical Layer Pipes); decoding the data of the PLPs; and processing BB (Base Band) frames in the PLPs to output streams, wherein at least one of the BB frames includes a stuffing field and a first indicator describing whether the stuffing field is included in the BB frame.

Preferably, the processing BB frames in the PLPs further includes, removing BB frame headers from the BB frames, and generating output streams by using data fields of the BB frames.

Preferably, the BB frame further includes a second indicator indicating length of the stuffing field.

Preferably, the BB frame further includes a third indicator having information about composition of the BB frame.

Preferably, the information in the third indicator indicates a type of stuffing data in the stuffing field.

Preferably, the decoding the data of the PLPs further includes, time deinterleaving the data of the PLPs, MIMO (Multi Input Multi Output) decoding the time deinterleaved data of the PLPs, demapping the MIMO decoded data from constellations, bit deinterleaving the demapped data, and processing the bit deinterleaved data with LDPC (Low Density Parity Check) codes to output BB frames.

In another aspect of the present invention, provided herein is an apparatus for transmitting broadcast signals including an input processing module for processing input streams into BB (Base Band) frames in PLPs (Physical Layer Pipes); an encoding module for encoding data of the PLPs; a frame building module for building at least one signal frame by mapping the encoded data of the PLPs; and a modulating module for modulating data in the built signal frame by OFDM (Orthogonal Frequency Division Multiplexing) method and transmitting the broadcast signals having the modulated data, wherein at least one of the BB frames includes a stuffing field and a first indicator describing whether the stuffing field is included in the BB frame.

Preferably, the input processing module further includes, a generating block for generating data fields of the BB frames by using the input streams, and a inserting block for inserting BB frame headers to the BB frames.

Preferably, the BB frame further includes a second indicator indicating length of the stuffing field.

Preferably, the BB frame further includes a third indicator having information about composition of the BB frame.

Preferably, the information in the third indicator indicates a type of stuffing data in the stuffing field.

Preferably, the encoding module further includes, a LDPC block for encoding the BB frames in the PLPs with LDPC (Low Density Parity Check) codes, a bit interleaving block for bit interleaving the LDPC encoded data in the PLPs, a constellation mapping block for mapping the bit interleaved data onto constellations, a MIMO (Multi Input Multi Output) block for MIMO encoding the mapped data, and a time interleaving block for time interleaving the MIMO encoded data.

In another aspect of the present invention, provided herein is an apparatus for receiving broadcast signals including a demodulating module for receiving the broadcast signals having at least one signal frame and demodulating data in the at least one signal frame by OFDM (Orthogonal Frequency Division Multiplexing) method; a frame parsing module for parsing the at least one signal frame by demapping data of PLPs (Physical Layer Pipes); a decoding module for decoding the data of the PLPs; and a output processing module for processing BB (Base Band) frames in the PLPs to output streams, wherein at least one of the BB frames includes a stuffing field and a first indicator describing whether the stuffing field is included in the BB frame.

Preferably, the output processing module further includes, a removing block for removing BB frame headers from the BB frames, and a generating block for generating output streams by using data fields of the BB frames.

Preferably, the BB frame further includes a second indicator indicating length of the stuffing field.

Preferably, the BB frame further includes a third indicator having information about composition of the BB frame.

Preferably, the information in the third indicator indicates a type of stuffing data in the stuffing field.

Preferably, the decoding module further includes, a time deinterleaving block for time deinterleaving the data of the PLPs, a MIMO (Multi Input Multi Output) decoding block for MIMO decoding the time deinterleaved data of the PLPs, a constellation demapping block for demapping the MIMO decoded data from constellations, a bit deinterleaving block for bit deinterleaving the demapped data, and a LDPC decoding block for processing the bit deinterleaved data with LDPC (Low Density Parity Check) codes to output BB frames.

The present invention can process data according to service characteristics to control QoS for each service or service component, thereby providing various broadcast services.

The present invention can achieve transmission flexibility by transmitting various broadcast services through the same RF signal bandwidth.

The present invention can improve data transmission efficiency and increase robustness of transmission/reception of broadcast signals using a MIMO system.

According to the present invention, it is possible to provide broadcast signal transmission and reception methods and apparatus capable of receiving digital broadcast signals without error even with mobile reception equipment or in an indoor environment

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 21 is a view illustrating a BB frame configuration method according to an embodiment of the present invention.

DETAILED DESCRIPTION OF THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

Figure 1:
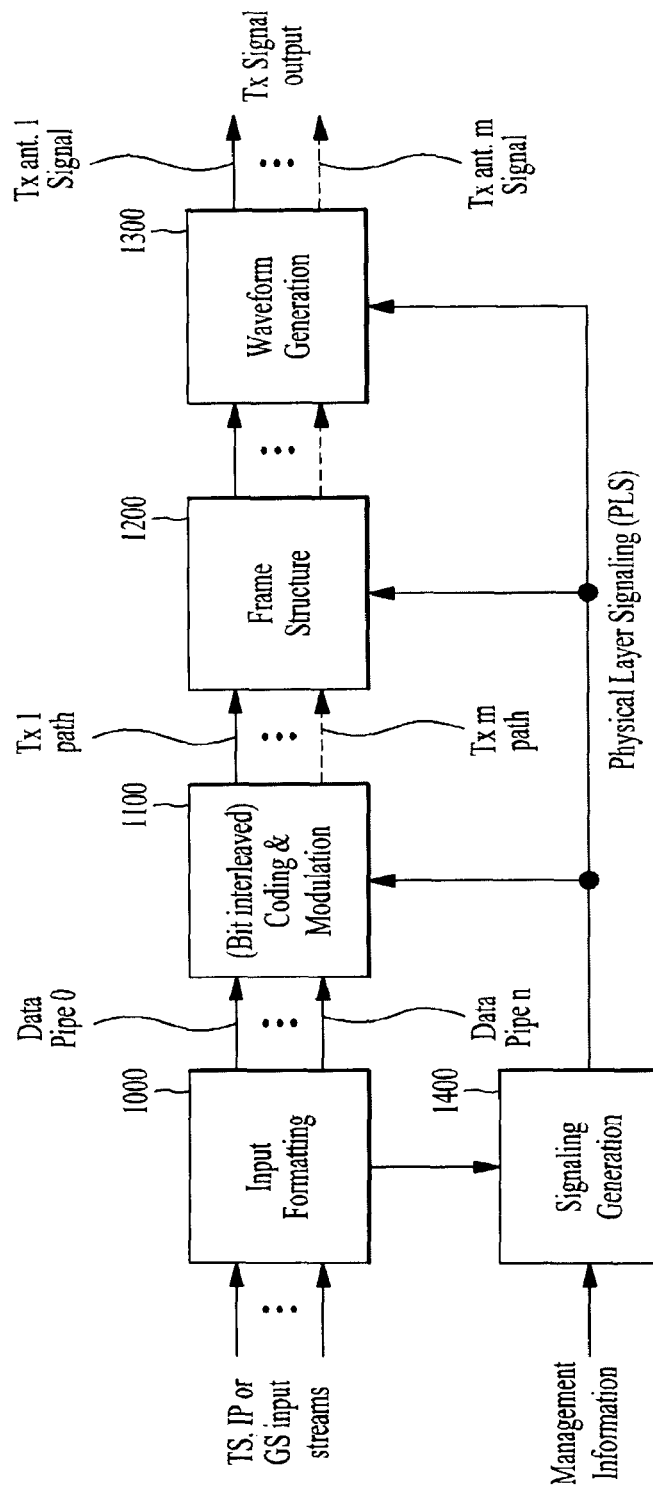
FIG. 1 illustrates a structure of an apparatus for transmitting broadcast signals for future broadcast services according to an embodiment of the present invention.

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting module 1000, a coding & modulation module 1100, a frame structure module 1200, a waveform generation module 1300 and a signaling generation module 1400. A description will be given of the operation of each module of the apparatus for transmitting broadcast signals.

Referring to FIG. 1, the apparatus for transmitting broadcast signals for future broadcast services according to an embodiment of the present invention can receive MPEG-TSs, IP streams (v4/v6) and generic streams (GSs) as an input signal. In addition, the apparatus for transmitting broadcast signals can receive management information about the configuration of each stream constituting the input signal and generate a final physical layer signal with reference to the received management information.

The input formatting module 1000 according to an embodiment of the present invention can classify the input streams on the basis of a standard for coding and modulation or services or service components and output the input streams as a plurality of logical data pipes (or data pipes or DP data). The data pipe is a logical channel in the physical layer that carries service data or related metadata, which may carry one or multiple service(s) or service component(s). In addition, data transmitted through each data pipe may be called DP data.

In addition, the input formatting module 1000 according to an embodiment of the present invention can divide each data pipe into blocks necessary to perform coding and modulation and carry out processes necessary to increase transmission efficiency or to perform scheduling. Details of operations of the input formatting module 1000 will be described later.

The coding & modulation module 1100 according to an embodiment of the present invention can perform forward error correction (FEC) encoding on each data pipe received from the input formatting module 1000 such that an apparatus for receiving broadcast signals can correct an error that may be generated on a transmission channel. In addition, the coding & modulation module 1100 according to an embodiment of the present invention can convert FEC output bit data to symbol data and interleave the symbol data to correct burst error caused by a channel. As shown in FIG. 1, the coding & modulation module 1100 according to an embodiment of the present invention can divide the processed data such that the divided data can be output through data paths for respective antenna outputs in order to transmit the data through two or more Tx antennas.

The frame structure module 1200 according to an embodiment of the present invention can map the data output from the coding & modulation module 1100 to signal frames. The frame structure module 1200 according to an embodiment of the present invention can perform mapping using scheduling information output from the input formatting module 1000 and interleave data in the signal frames in order to obtain additional diversity gain.

The waveform generation module 1300 according to an embodiment of the present invention can convert the signal frames output from the frame structure module 1200 into a signal for transmission. In this case, the waveform generation module 1300 according to an embodiment of the present invention can insert a preamble signal (or preamble) into the signal for detection of the transmission apparatus and insert a reference signal for estimating a transmission channel to compensate for distortion into the signal. In addition, the waveform generation module 1300 according to an embodiment of the present invention can provide a guard interval and insert a specific sequence into the same in order to offset the influence of channel delay spread due to multi-path reception. Additionally, the waveform generation module 1300 according to an embodiment of the present invention can perform a procedure necessary for efficient transmission in consideration of signal characteristics such as a peak-to-average power ratio of the output signal.

The signaling generation module 1400 according to an embodiment of the present invention generates final physical layer signaling information using the input management information and information generated by the input formatting module 1000, coding & modulation module 1100 and frame structure module 1200. Accordingly, a reception apparatus according to an embodiment of the present invention can decode a received signal by decoding the signaling information.

As described above, the apparatus for transmitting broadcast signals for future broadcast services according to one embodiment of the present invention can provide terrestrial broadcast service, mobile broadcast service, UHDTV service, etc. Accordingly, the apparatus for transmitting broadcast signals for future broadcast services according to one embodiment of the present invention can multiplex signals for different services in the time domain and transmit the same.

Figure 2:
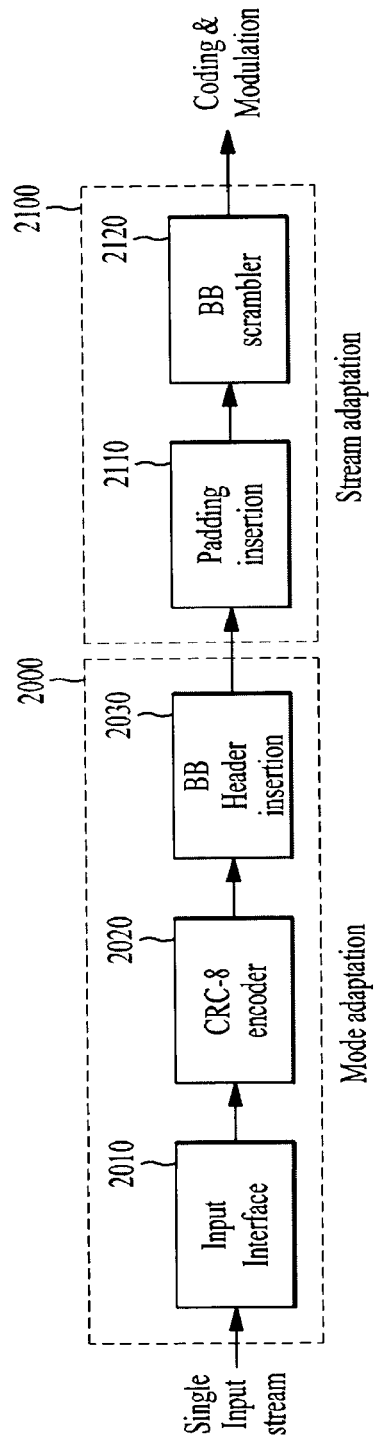
FIG. 2 illustrates an input formatting module according to an embodiment of the present invention.
Figure 3:
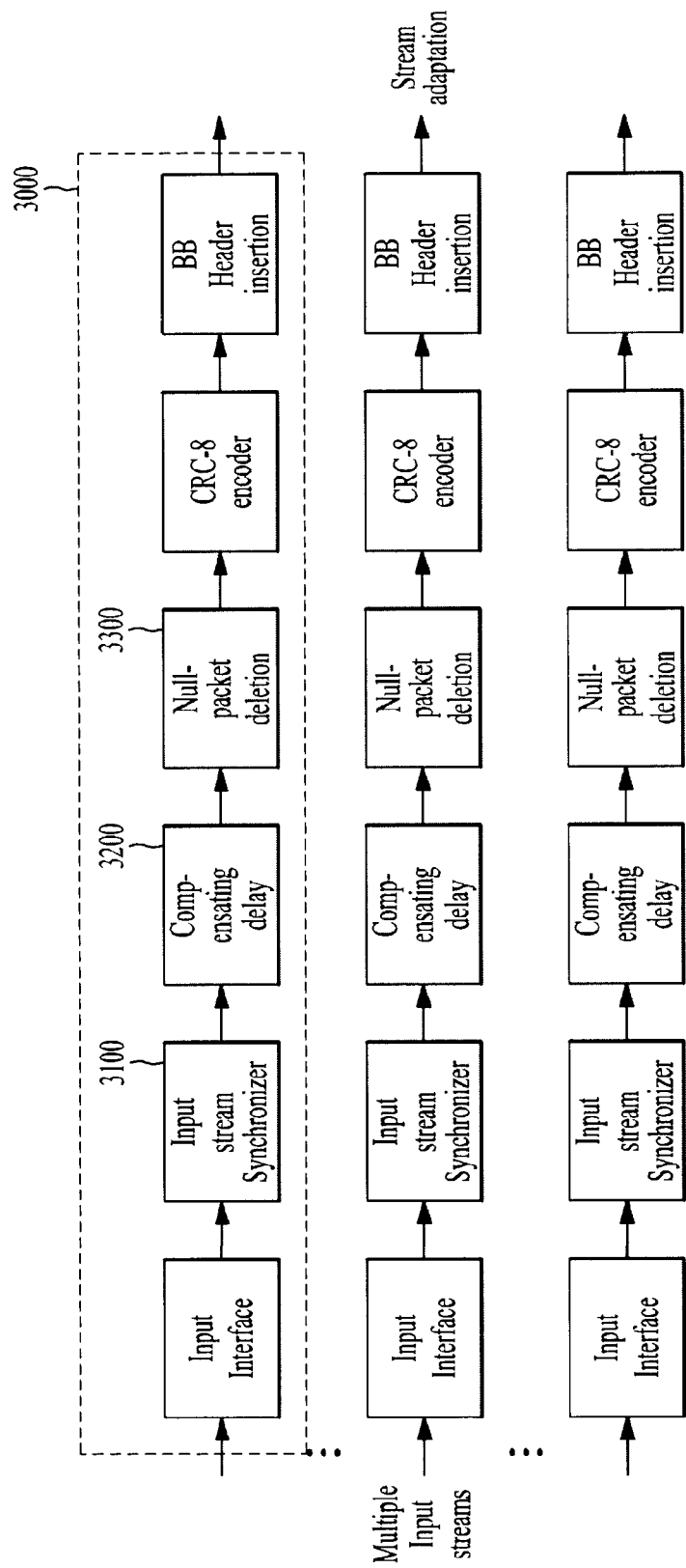
FIG. 3 illustrates an input formatting module according to another embodiment of the present invention.
Figure 4:
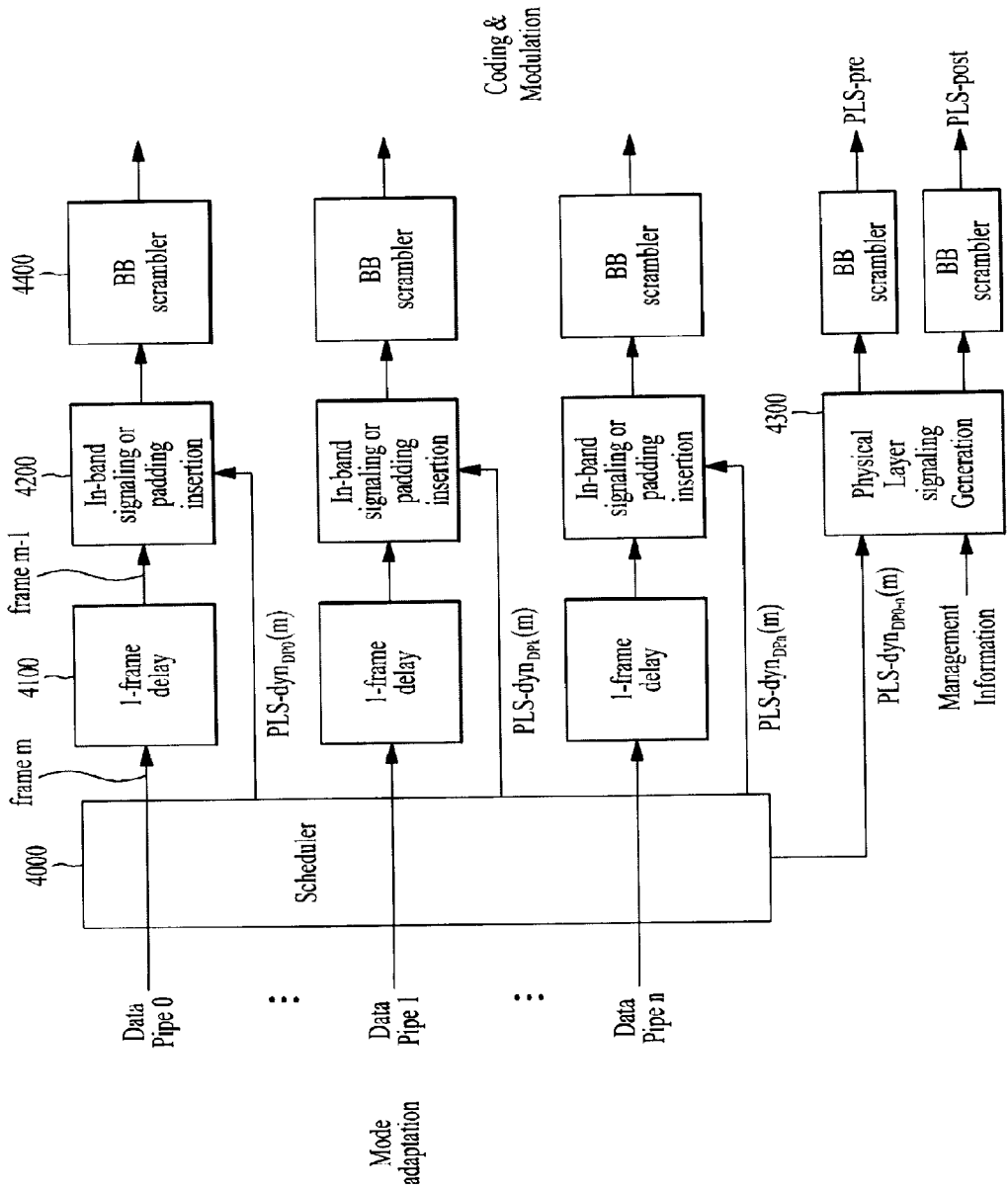
FIG. 4 illustrates an input formatting module according to another embodiment of the present invention.

FIGS. 2, 3 and 4 illustrate the input formatting module 1000 according to embodiments of the present invention. A description will be given of each figure.

FIG. 2 illustrates an input formatting module according to one embodiment of the present invention. FIG. 2 shows an input formatting module when the input signal is a single input stream.

Referring to FIG. 2, the input formatting module according to one embodiment of the present invention can include a mode adaptation module 2000 and a stream adaptation module 2100.

As shown in FIG. 2, the mode adaptation module 2000 can include an input interface block 2010, a CRC-8 encoder block 2020 and a BB header insertion block 2030. Description will be given of each block of the mode adaptation module 2000.

The input interface block 2010 can divide the single input stream input thereto into data pieces each having the length of a baseband (BB) frame used for FEC (BCH/LDPC) which will be performed later and output the data pieces.

The CRC-8 encoder block 2020 can perform CRC encoding on BB frame data to add redundancy data thereto.

The BB header insertion block 2030 can insert, into the BB frame data, a header including information such as mode adaptation type (TS/GS/IP), a user packet length, a data field length, user packet sync byte, start address of user packet sync byte in data field, a high efficiency mode indicator, an input stream synchronization field, etc.

As shown in FIG. 2, the stream adaptation module 2100 can include a padding insertion block 2110 and a BB scrambler block 2120. Description will be given of each block of the stream adaptation module 2100.

If data received from the mode adaptation module 2000 has a length shorter than an input data length necessary for FEC encoding, the padding insertion block 2110 can insert a padding bit into the data such that the data has the input data length and output the data including the padding bit.

The BB scrambler block 2120 can randomize the input bit stream by performing an XOR operation on the input bit stream and a pseudo random binary sequence (PRBS).

The above-described blocks may be omitted or replaced by blocks having similar or identical functions.

As shown in FIG. 2, the input formatting module can finally output data pipes to the coding & modulation module.

FIG. 3 illustrates an input formatting module according to another embodiment of the present invention. FIG. 3 shows a mode adaptation module 3000 of the input formatting module when the input signal corresponds to multiple input streams.

The mode adaptation module 3000 of the input formatting module for processing the multiple input streams can independently process the multiple input streams.

Referring to FIG. 3, the mode adaptation module 3000 for respectively processing the multiple input streams can include input interface blocks, input stream synchronizer blocks 3100, compensating delay blocks 3200, null packet deletion blocks 3300, CRC-8 encoder blocks and BB header insertion blocks. Description will be given of each block of the mode adaptation module 3000.

Operations of the input interface block, CRC-8 encoder block and BB header insertion block correspond to those of the input interface block, CRC-8 encoder block and BB header insertion block described with reference to FIG. 2 and thus description thereof is omitted.

The input stream synchronizer block 3100 can transmit input stream clock reference (ISCR) information to generate timing information necessary for the apparatus for receiving broadcast signals to restore the TSs or GSs.

The compensating delay block 3200 can delay input data and output the delayed input data such that the apparatus for receiving broadcast signals can synchronize the input data if a delay is generated between data pipes according to processing of data including the timing information by the transmission apparatus.

The null packet deletion block 3300 can delete unnecessarily transmitted input null packets from the input data, insert the number of deleted null packets into the input data based on positions in which the null packets are deleted and transmit the input data.

The above-described blocks may be omitted or replaced by blocks having similar or identical functions.

FIG. 4 illustrates an input formatting module according to another embodiment of the present invention.

Specifically, FIG. 4 illustrates a stream adaptation module of the input formatting module when the input signal corresponds to multiple input streams.

The stream adaptation module of the input formatting module when the input signal corresponds to multiple input streams can include a scheduler 4000, a 1-frame delay block 4100, an in-band signaling or padding insertion block 4200, a physical layer signaling generation block 4300 and a BB scrambler block 4400. Description will be given of each block of the stream adaptation module.

The scheduler 4000 can perform scheduling for a MIMO system using multiple antennas having dual polarity. In addition, the scheduler 4000 can generate parameters for use in signal processing blocks for antenna paths, such as a bit-to-cell demux block, a cell interleaver block, a time interleaver block, etc. included in the coding & modulation module illustrated in FIG. 1.

The 1-frame delay block 4100 can delay the input data by one transmission frame such that scheduling information about the next frame can be transmitted through the current frame for in-band signaling information to be inserted into the data pipes.

The in-band signaling or padding insertion block 4200 can insert undelayed physical layer signaling (PLS)-dynamic signaling information into the data delayed by one transmission frame. In this case, the in-band signaling or padding insertion block 4200 can insert a padding bit when a space for padding is present or insert in-band signaling information into the padding space. In addition, the scheduler 4000 can output physical layer signaling-dynamic signaling information about the current frame separately from in-band signaling information. Accordingly, a cell mapper, which will be described later, can map input cells according to scheduling information output from the scheduler 4000.

The physical layer signaling generation block 4300 can generate physical layer signaling data which will be transmitted through a preamble symbol of a transmission frame or spread and transmitted through a data symbol other than the in-band signaling information. In this case, the physical layer signaling data according to an embodiment of the present invention can be referred to as signaling information. Furthermore, the physical layer signaling data according to an embodiment of the present invention can be divided into PLS-pre information and PLS-post information. The PLS-pre information can include parameters necessary to encode the PLS-post information and static PLS signaling data and the PLS-post information can include parameters necessary to encode the data pipes. The parameters necessary to encode the data pipes can be classified into static PLS signaling data and dynamic PLS signaling data. The static PLS signaling data is a parameter commonly applicable to all frames included in a super-frame and can be changed on a super-frame basis. The dynamic PLS signaling data is a parameter differently applicable to respective frames included in a super-frame and can be changed on a frame-by-frame basis. Accordingly, the reception apparatus can acquire the PLS-post information by decoding the PLS-pre information and decode desired data pipes by decoding the PLS-post information.

The BB scrambler block 4400 can generate a pseudo-random binary sequence (PRBS) and perform an XOR operation on the PRBS and the input bit streams to decrease the peak-to-average power ratio (PAPR) of the output signal of the waveform generation block. As shown in FIG. 4, scrambling of the BB scrambler block 4400 is applicable to both data pipes and physical layer signaling information.

The above-described blocks may be omitted or replaced by blocks having similar or identical functions according to designer.

As shown in FIG. 4, the stream adaptation module can finally output the data pipes to the coding & modulation module.

Figure 5:
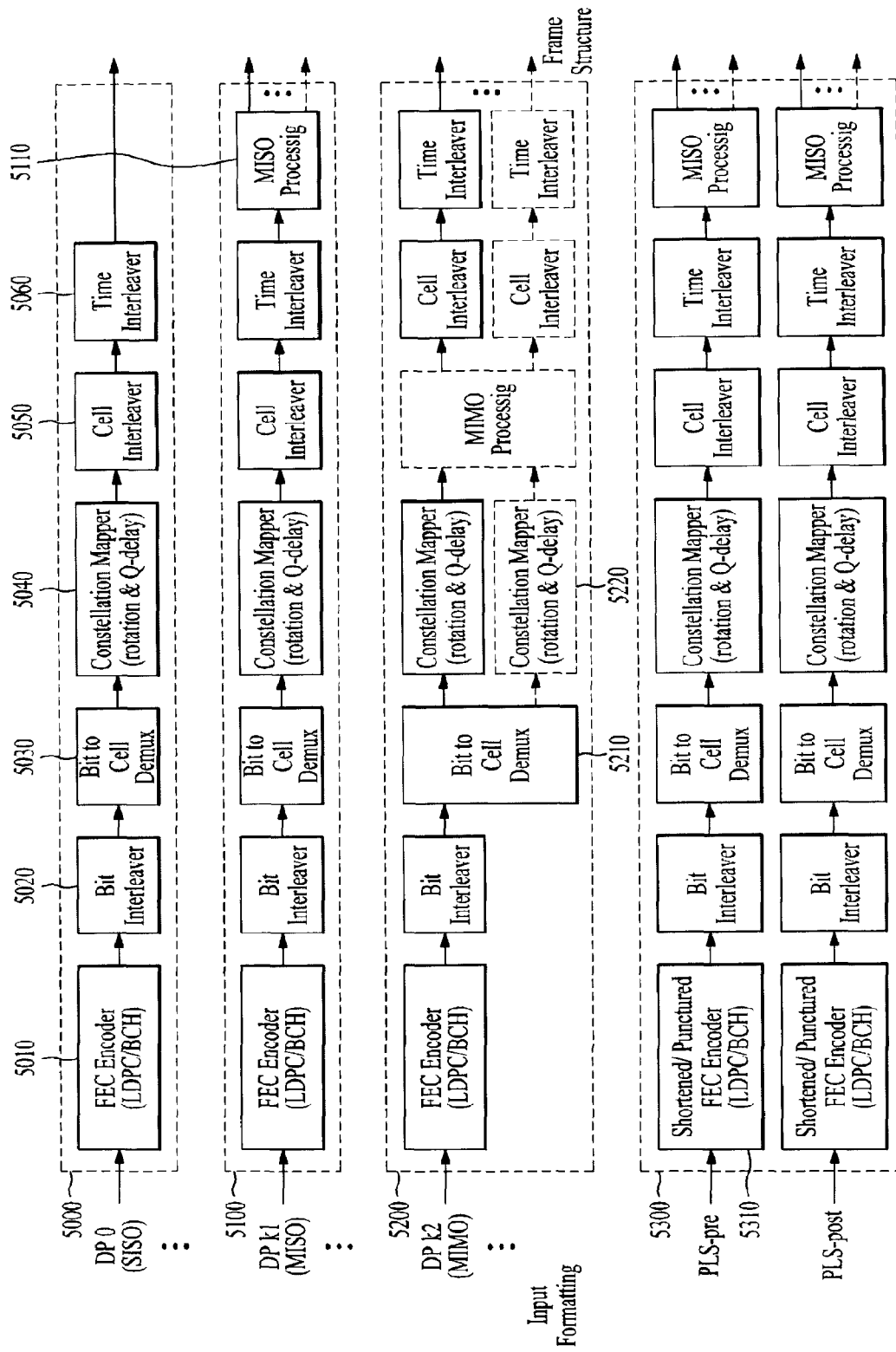
FIG. 5 illustrates a coding & modulation module according to an embodiment of the present invention.

FIG. 5 illustrates a coding & modulation module according to an embodiment of the present invention.

The coding & modulation module shown in FIG. 5 corresponds to an embodiment of the coding & modulation module illustrated in FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the coding & modulation module according to an embodiment of the present invention can independently process data pipes input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each data pipe.

Accordingly, the coding & modulation module according to an embodiment of the present invention can include a first block 5000 for SISO, a second block 5100 for MISO, a third block 5200 for MIMO and a fourth block 5300 for processing the PLS-pre/PLS-post information. The coding & modulation module illustrated in FIG. 5 is an exemplary and may include only the first block 5000 and the fourth block 5300, the second block 5100 and the fourth block 5300 or the third block 5200 and the fourth block 5300 according to design. That is, the coding & modulation module can include blocks for processing data pipes equally or differently according to design.

A description will be given of each block of the coding & modulation module.

The first block 5000 processes an input data pipe according to SISO and can include an FEC encoder block 5010, a bit interleaver block 5020, a bit-to-cell demux block 5030, a constellation mapper block 5040, a cell interleaver block 5050 and a time interleaver block 5060.

The FEC encoder block 5010 can perform BCH encoding and LDPC encoding on the input data pipe to add redundancy thereto such that the reception apparatus can correct an error generated on a transmission channel.

The bit interleaver block 5020 can interleave bit streams of the FEC-encoded data pipe according to an interleaving rule such that the bit streams have robustness against burst error that may be generated on the transmission channel. Accordingly, when deep fading or erasure is applied to QAM symbols, errors can be prevented from being generated in consecutive bits from among all codeword bits since interleaved bits are mapped to the QAM symbols.

The bit-to-cell demux block 5030 can determine the order of input bit streams such that each bit in an FEC block can be transmitted with appropriate robustness in consideration of both the order of input bit streams and a constellation mapping rule.

In addition, the bit interleaver block 5020 is located between the FEC encoder block 5010 and the constellation mapper block 5040 and can connect output bits of LDPC encoding performed by the FEC encoder block 5010 to bit positions having different reliability values and optimal values of the constellation mapper in consideration of LDPC decoding of the apparatus for receiving broadcast signals. Accordingly, the bit-to-cell demux block 5030 can be replaced by a block having a similar or equal function.

The constellation mapper block 5040 can map a bit word input thereto to one constellation. In this case, the constellation mapper block 5040 can additionally perform rotation & Q-delay. That is, the constellation mapper block 5040 can rotate input constellations according to a rotation angle, divide the constellations into an in-phase component and a quadrature-phase component and delay only the quadrature-phase component by an arbitrary value. Then, the constellation mapper block 5040 can remap the constellations to new constellations using a paired in-phase component and quadrature-phase component.

In addition, the constellation mapper block 5040 can move constellation points on a two-dimensional plane in order to find optimal constellation points. Through this process, capacity of the coding & modulation module 1100 can be optimized. Furthermore, the constellation mapper block 5040 can perform the above-described operation using IQ-balanced constellation points and rotation. The constellation mapper block 5040 can be replaced by a block having a similar or equal function.

The cell interleaver block 5050 can randomly interleave cells corresponding to one FEC block and output the interleaved cells such that cells corresponding to respective FEC blocks can be output in different orders.

The time interleaver block 5060 can interleave cells belonging to a plurality of FEC blocks and output the interleaved cells. Accordingly, the cells corresponding to the FEC blocks are dispersed and transmitted in a period corresponding to a time interleaving depth and thus diversity gain can be obtained.

The second block 5100 processes an input data pipe according to MISO and can include the FEC encoder block, bit interleaver block, bit-to-cell demux block, constellation mapper block, cell interleaver block and time interleaver block in the same manner as the first block 5000. However, the second block 5100 is distinguished from the first block 5000 in that the second block 5100 further includes a MISO processing block 5110. The second block 5100 performs the same procedure including the input operation to the time interleaver operation as those of the first block 5000 and thus description of the corresponding blocks is omitted.

The MISO processing block 5110 can encode input cells according to a MISO encoding matrix providing transmit diversity and output MISO-processed data through two paths. MISO processing according to one embodiment of the present invention can include OSTBC (orthogonal space time block coding)/OSFBC (orthogonal space frequency block coding, Alamouti coding).

The third block 5200 processes an input data pipe according to MIMO and can include the FEC encoder block, bit interleaver block, bit-to-cell demux block, constellation mapper block, cell interleaver block and time interleaver block in the same manner as the second block 5100, as shown in FIG. 5. However, the data processing procedure of the third block 5200 is different from that of the second block 5100 since the third block 5200 includes a MIMO processing block 5220.

That is, in the third block 5200, basic roles of the FEC encoder block and the bit interleaver block are identical to those of the first and second blocks 5000 and 5100 although functions thereof may be different from those of the first and second blocks 5000 and 5100.

The bit-to-cell demux block 5210 can generate as many output bit streams as input bit streams of MIMO processing and output the output bit streams through MIMO paths for MIMO processing. In this case, the bit-to-cell demux block 5210 can be designed to optimize the decoding performance of the reception apparatus in consideration of characteristics of LDPC and MIMO processing.

Basic roles of the constellation mapper block, cell interleaver block and time interleaver block are identical to those of the first and second blocks 5000 and 5100 although functions thereof may be different from those of the first and second blocks 5000 and 5100. As shown in FIG. 5, as many constellation mapper blocks, cell interleaver blocks and time interleaver blocks as the number of MIMO paths for MIMO processing can be present. In this case, the constellation mapper blocks, cell interleaver blocks and time interleaver blocks can operate equally or independently for data input through the respective paths.

The MIMO processing block 5220 can perform MIMO processing on two input cells using a MIMO encoding matrix and output the MIMO-processed data through two paths. The MIMO encoding matrix according to an embodiment of the present invention can include spatial multiplexing, Golden code, full-rate full diversity code, linear dispersion code, etc.

The fourth block 5300 processes the PLS-pre/PLS-post information and can perform SISO or MISO processing.

The basic roles of the bit interleaver block, bit-to-cell demux block, constellation mapper block, cell interleaver block, time interleaver block and MISO processing block included in the fourth block 5300 correspond to those of the second block 5100 although functions thereof may be different from those of the second block 5100.

A shortened/punctured FEC encoder block 5310 included in the fourth block 5300 can process PLS data using an FEC encoding scheme for a PLS path provided for a case in which the length of input data is shorter than a length necessary to perform FEC encoding. Specifically, the shortened/punctured FEC encoder block 5310 can perform BCH encoding on input bit streams, pad 0s corresponding to a desired input bit stream length necessary for normal LDPC encoding, carry out LDPC encoding and then remove the padded 0s to puncture parity bits such that an effective code rate becomes equal to or lower than the data pipe rate.

The blocks included in the first block 5000 to fourth block 5300 may be omitted or replaced by blocks having similar or identical functions according to design.

As illustrated in FIG. 5, the coding & modulation module can output the data pipes (or DP data), PLS-pre information and PLS-post information processed for the respective paths to the frame structure module.

Figure 6:
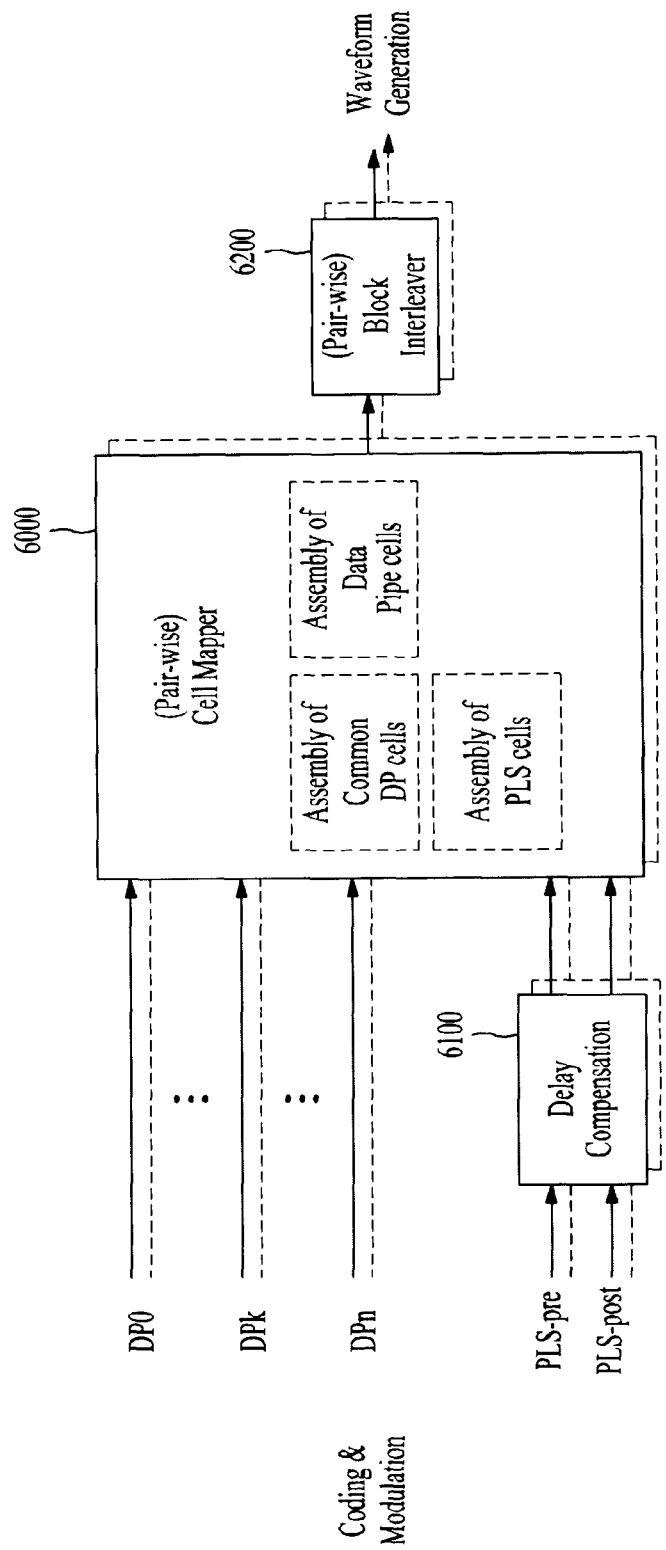
FIG. 6 illustrates a frame structure module according to an embodiment of the present invention.

FIG. 6 illustrates a frame structure module according to one embodiment of the present invention.

The frame structure module shown in FIG. 6 corresponds to an embodiment of the frame structure module 1200 illustrated in FIG. 1.

The frame structure module according to one embodiment of the present invention can include at least one cell-mapper 6000, at least one delay compensation module 6100 and at least one block interleaver 6200. The number of cell mappers 6000, delay compensation modules 6100 and block interleavers 6200 can be changed. A description will be given of each module of the frame structure block.

The cell-mapper 6000 can allocate (or arrange) cells corresponding to SISO-, MISO- or MIMO-processed data pipes output from the coding & modulation module, cells corresponding to common data commonly applicable to the data pipes and cells corresponding to the PLS-pre/PLS-post information to signal frames according to scheduling information. The common data refers to signaling information commonly applied to all or some data pipes and can be transmitted through a specific data pipe. The data pipe through which the common data is transmitted can be referred to as a common data pipe and can be changed according to design.

When the apparatus for transmitting broadcast signals according to an embodiment of the present invention uses two output antennas and Alamouti coding is used for MISO processing, the cell-mapper 6000 can perform pair-wise cell mapping in order to maintain orthogonality according to Alamouti encoding. That is, the cell-mapper 6000 can process two consecutive cells of the input cells as one unit and map (or arrange) the unit to a frame. Accordingly, paired cells in an input path corresponding to an output path of each antenna can be allocated (or arranged) to neighboring positions in a transmission frame.

The delay compensation block 6100 can obtain PLS data corresponding to the current transmission frame by delaying input PLS data cells for the next transmission frame by one frame. In this case, the PLS data corresponding to the current frame can be transmitted through a preamble part in the current signal frame and PLS data corresponding to the next signal frame can be transmitted through a preamble part in the current signal frame or in-band signaling in each data pipe of the current signal frame. This can be changed by the designer.

The block interleaver 6200 can obtain additional diversity gain by interleaving cells in a transport block corresponding to the unit of a signal frame. In addition, the block interleaver 6200 can perform interleaving by processing two consecutive cells of the input cells as one unit when the above-described pair-wise cell mapping is performed. Accordingly, cells output from the block interleaver 6200 can be two consecutive identical cells.

When pair-wise mapping and pair-wise interleaving are performed, at least one cell mapper and at least one block interleaver can operate equally or independently for data input through the paths.

The above-described blocks may be omitted or replaced by blocks having similar or identical functions according to design.

As illustrated in FIG. 6, the frame structure module can output at least one signal frame to the waveform generation module.

Figure 7:
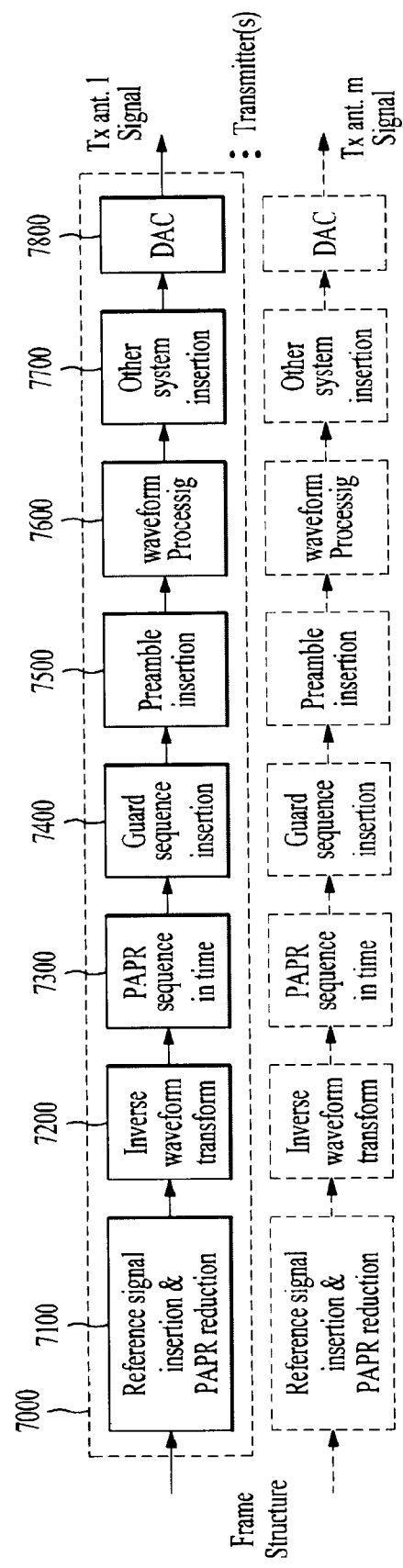
FIG. 7 illustrates a waveform generation module according to an embodiment of the present invention.

FIG. 7 illustrates a waveform generation module according to an embodiment of the present invention.

The waveform generation module illustrated in FIG. 7 corresponds to an embodiment of the waveform generation module 1300 described with reference to FIG. 1.

The waveform generation module according to an embodiment of the present invention can modulate and transmit as many signal frames as the number of antennas for receiving and outputting signal frames output from the frame structure module illustrated in FIG. 6.

Specifically, the waveform generation module illustrated in FIG. 7 is an embodiment of a waveform generation module of an apparatus for transmitting broadcast signals using m Tx antennas and can include m processing blocks for modulating and outputting frames corresponding to m paths. The m processing blocks can perform the same processing procedure. A description will be given of operation of the first processing block 7000 from among the m processing blocks.

The first processing block 7000 can include a reference signal & PAPR reduction block 7100, an inverse waveform transform block 7200, a PAPR reduction in time block 7300, a guard sequence insertion block 7400, a preamble insertion block 7500, a waveform processing block 7600, other system insertion block 7700 and a DAC (digital analog converter) block 7800.

The reference signal insertion & PAPR reduction block 7100 can insert a reference signal into a predetermined position of each signal block and apply a PAPR reduction scheme to reduce a PAPR in the time domain. If a broadcast transmission/reception system according to an embodiment of the present invention corresponds to an OFDM system, the reference signal insertion & PAPR reduction block 7100 can use a method of reserving some active subcarriers rather than using the same. In addition, the reference signal insertion & PAPR reduction block 7100 may not use the PAPR reduction scheme as an optional feature according to broadcast transmission/reception system.

The inverse waveform transform block 7200 can transform an input signal in a manner of improving transmission efficiency and flexibility in consideration of transmission channel characteristics and system architecture. If the broadcast transmission/reception system according to an embodiment of the present invention corresponds to an OFDM system, the inverse waveform transform block 7200 can employ a method of transforming a frequency domain signal into a time domain signal through inverse FFT operation. If the broadcast transmission/reception system according to an embodiment of the present invention corresponds to a single carrier system, the inverse waveform transform block 7200 may not be used in the waveform generation module.

The PAPR reduction in time block 7300 can use a method for reducing PAPR of an input signal in the time domain. If the broadcast transmission/reception system according to an embodiment of the present invention corresponds to an OFDM system, the PAPR reduction in time block 7300 may use a method of simply clipping peak amplitude. Furthermore, the PAPR reduction in time block 7300 may not be used in the broadcast transmission/reception system according to an embodiment of the present invention since it is an optional feature.

The guard sequence insertion block 7400 can provide a guard interval between neighboring signal blocks and insert a specific sequence into the guard interval as necessary in order to minimize the influence of delay spread of a transmission channel. Accordingly, the reception apparatus can easily perform synchronization or channel estimation. If the broadcast transmission/reception system according to an embodiment of the present invention corresponds to an OFDM system, the guard sequence insertion block 7400 may insert a cyclic prefix into a guard interval of an OFDM symbol.

The preamble insertion block 7500 can insert a signal of a known type (e.g. the preamble or preamble symbol) agreed upon between the transmission apparatus and the reception apparatus into a transmission signal such that the reception apparatus can rapidly and efficiently detect a target system signal. If the broadcast transmission/reception system according to an embodiment of the present invention corresponds to an OFDM system, the preamble insertion block 7500 can define a signal frame composed of a plurality of OFDM symbols and insert a preamble symbol into the beginning of each signal frame. That is, the preamble carries basic PLS data and is located in the beginning of a signal frame.

The waveform processing block 7600 can perform waveform processing on an input baseband signal such that the input baseband signal meets channel transmission characteristics. The waveform processing block 7600 may use a method of performing square-root-raised cosine (SRRC) filtering to obtain a standard for out-of-band emission of a transmission signal. If the broadcast transmission/reception system according to an embodiment of the present invention corresponds to a multi-carrier system, the waveform processing block 7600 may not be used.

The other system insertion block 7700 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 7800 can convert an input digital signal into an analog signal and output the analog signal. The signal output from the DAC block 7800 can be transmitted through m output antennas. A Tx antenna according to an embodiment of the present invention can have vertical or horizontal polarity.

The above-described blocks may be omitted or replaced by blocks having similar or identical functions according to design.

Figure 8:
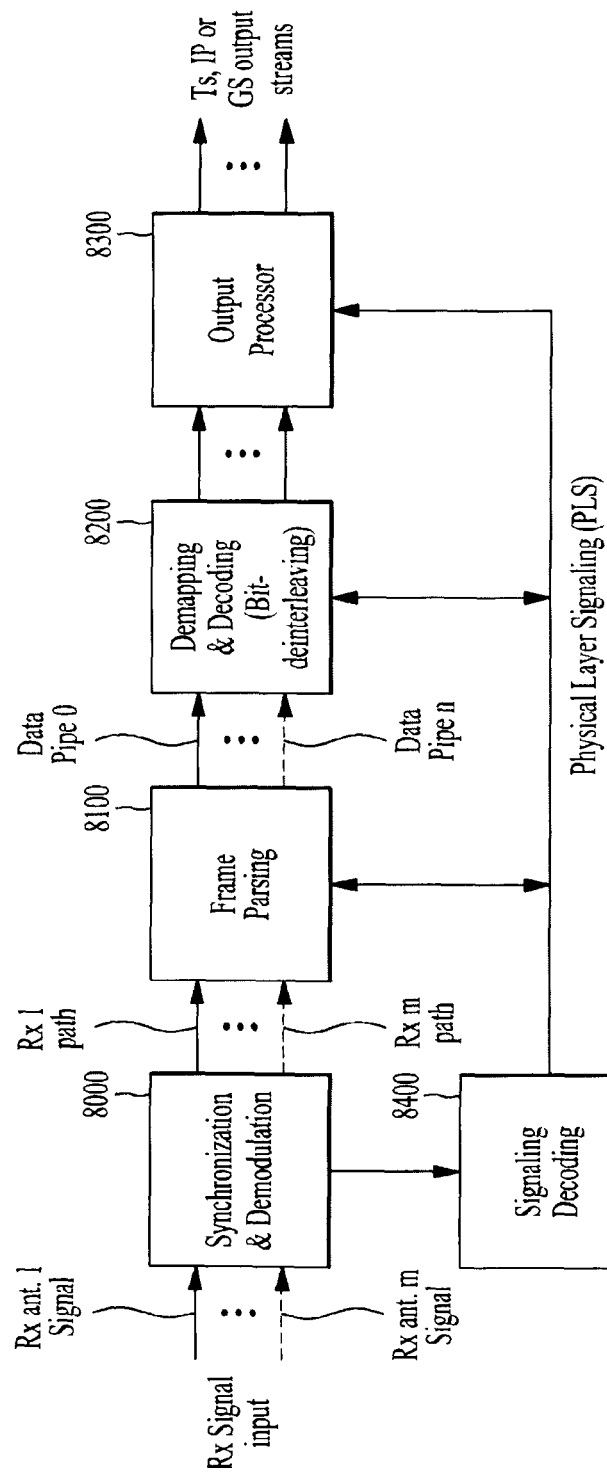
FIG. 8 illustrates a structure of an apparatus for receiving broadcast signals for future broadcast services according to an embodiment of the present invention.

FIG. 8 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1. The apparatus for receiving broadcast signals for future broadcast services according to an embodiment of the present invention can include a synchronization & demodulation module 8000, a frame parsing module 8100, a demapping & decoding module 8200, an output processor 8300 and a signaling decoding module 8400. A description will be given of operation of each module of the apparatus for receiving broadcast signals.

The synchronization & demodulation module 8000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 8100 can parse input signal frames and extract data through which a service selected by a user is transmitted. If the apparatus for transmitting broadcast signals performs interleaving, the frame parsing module 8100 can carry out deinterleaving corresponding to a reverse procedure of interleaving. In this case, the positions of a signal and data that need to be extracted can be obtained by decoding data output from the signaling decoding module 8400 to restore scheduling information generated by the apparatus for transmitting broadcast signals.

The demapping & decoding module 8200 can convert the input signals into bit domain data and then deinterleave the same as necessary. The demapping & decoding module 8200 can perform demapping for mapping applied for transmission efficiency and correct an error generated on a transmission channel through decoding. In this case, the demapping & decoding module 8200 can obtain transmission parameters necessary for demapping and decoding by decoding the data output from the signaling decoding module 8400.

The output processor 8300 can perform reverse procedures of various compression/signal processing procedures which are applied by the apparatus for transmitting broadcast signals to improve transmission efficiency. In this case, the output processor 8300 can acquire necessary control information from data output from the signaling decoding module 8400. The output of the output processor 8300 corresponds to a signal input to the apparatus for transmitting broadcast signals and may be MPEG-TSs, IP streams (v4 or v6) and generic streams.

The signaling decoding module 8400 can obtain PLS information from the signal demodulated by the synchronization & demodulation module 8000. As described above, the frame parsing module 8100, demapping & decoding module 8200 and output processor 8300 can execute functions thereof using the data output from the signaling decoding module 8400.

Figure 9:
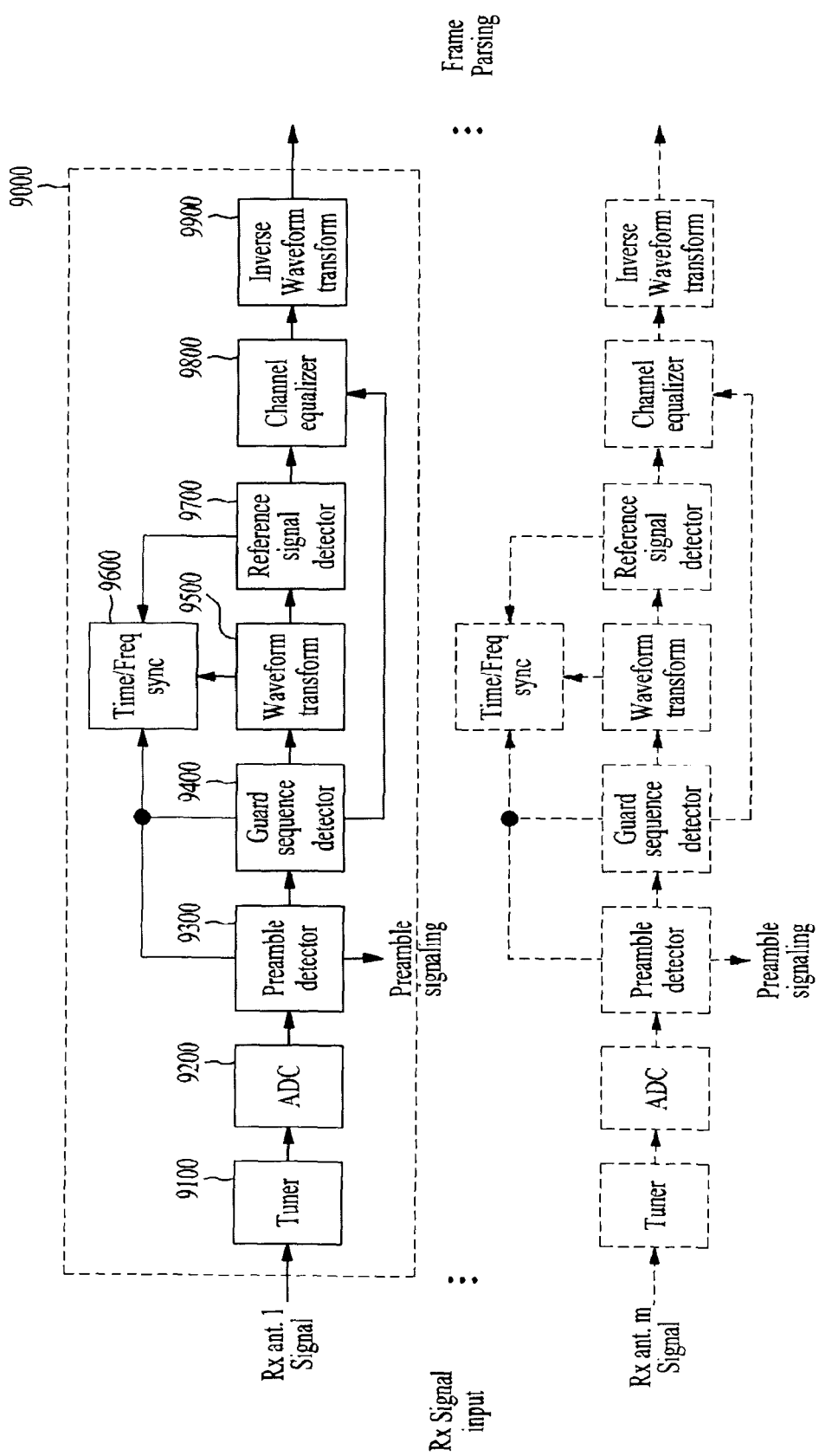
FIG. 9 illustrates a synchronization & demodulation module according to an embodiment of the present invention.

FIG. 9 illustrates a synchronization & demodulation module according to an embodiment of the present invention.

The synchronization & demodulation module shown in FIG. 9 corresponds to an embodiment of the synchronization & demodulation module described with reference to FIG. 8. The synchronization & demodulation module shown in FIG. 9 can perform a reverse operation of the operation of the waveform generation module illustrated in FIG. 7.

As shown in FIG. 9, the synchronization & demodulation module according to an embodiment of the present invention corresponds to a synchronization & demodulation module of an apparatus for receiving broadcast signals using m Rx antennas and can include m processing blocks for demodulating signals respectively input through m paths. The m processing blocks can perform the same processing procedure. A description will be given of operation of the first processing block 9000 from among the m processing blocks.

The first processing block 9000 can include a tuner 9100, an ADC block 9200, a preamble detector 9300, a guard sequence detector 9400, a waveform transform block 9500, a time/frequency synchronization block 9600, a reference signal detector 9700, a channel equalizer 9800 and an inverse waveform transform block 9900.

The tuner 9100 can select a desired frequency band, compensate for the magnitude of a received signal and output the compensated signal to the ADC block 9200.

The ADC block 9200 can convert the signal output from the tuner 9100 into a digital signal.

The preamble detector 9300 can detect a preamble (or preamble signal or preamble symbol) in order to check whether or not the digital signal is a signal of the system corresponding to the apparatus for receiving broadcast signals. In this case, the preamble detector 9300 can decode basic transmission parameters received through the preamble.

The guard sequence detector 9400 can detect a guard sequence in the digital signal. The time/frequency synchronization block 9600 can perform time/frequency synchronization using the detected guard sequence and the channel equalizer 9800 can estimate a channel through a received/restored sequence using the detected guard sequence.

The waveform transform block 9500 can perform a reverse operation of inverse waveform transform when the apparatus for transmitting broadcast signals has performed inverse waveform transform. When the broadcast transmission/reception system according to one embodiment of the present invention is a multi-carrier system, the waveform transform block 9500 can perform FFT. Furthermore, when the broadcast transmission/reception system according to an embodiment of the present invention is a single carrier system, the waveform transform block 9500 may not be used if a received time domain signal is processed in the frequency domain or processed in the time domain.

The time/frequency synchronization block 9600 can receive output data of the preamble detector 9300, guard sequence detector 9400 and reference signal detector 9700 and perform time synchronization and carrier frequency synchronization including guard sequence detection and block window positioning on a detected signal. Here, the time/frequency synchronization block 9600 can feed back the output signal of the waveform transform block 9500 for frequency synchronization.

The reference signal detector 9700 can detect a received reference signal. Accordingly, the apparatus for receiving broadcast signals according to an embodiment of the present invention can perform synchronization or channel estimation.

The channel equalizer 9800 can estimate a transmission channel from each Tx antenna to each Rx antenna from the guard sequence or reference signal and perform channel equalization for received data using the estimated channel.

The inverse waveform transform block 9900 may restore the original received data domain when the waveform transform block 9500 performs waveform transform for efficient synchronization and channel estimation/equalization. If the broadcast transmission/reception system according to an embodiment of the present invention is a single carrier system, the waveform transform block 9500 can perform FFT in order to carry out synchronization/channel estimation/equalization in the frequency domain and the inverse waveform transform block 9900 can perform IFFT on the channel-equalized signal to restore transmitted data symbols. If the broadcast transmission/reception system according to an embodiment of the present invention is a multi-carrier system, the inverse waveform transform block 9900 may not be used.

The above-described blocks may be omitted or replaced by blocks having similar or identical functions according to design.

Figure 10:
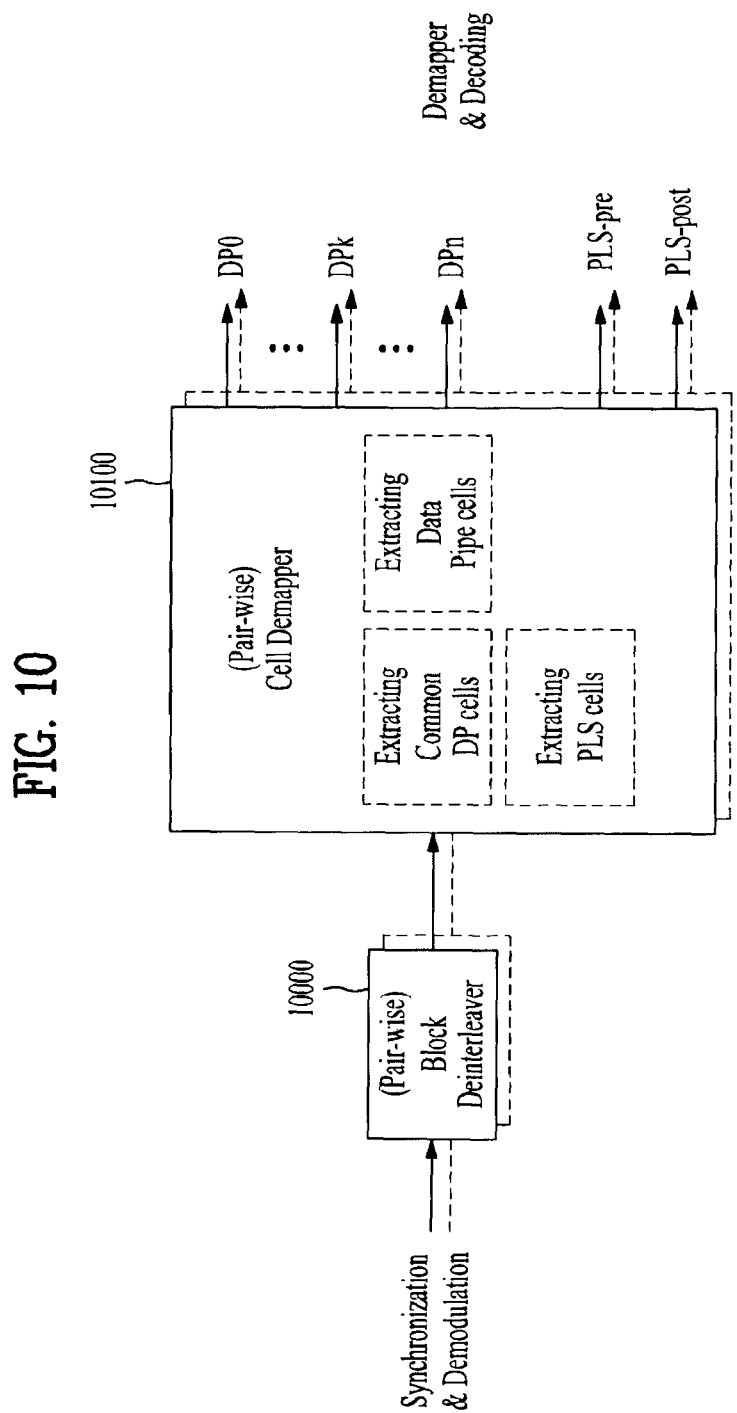
FIG. 10 illustrates a frame parsing module according to an embodiment of the present invention.

FIG. 10 illustrates a frame parsing module according to an embodiment of the present invention.

The frame parsing module illustrated in FIG. 10 corresponds to an embodiment of the frame parsing module described with reference to FIG. 8. The frame parsing module shown in FIG. 10 can perform a reverse operation of the operation of the frame structure module illustrated in FIG. 6.

As shown in FIG. 10, the frame parsing module according to an embodiment of the present invention can include at least one block interleaver 10000 and at least one cell demapper 10100.

The block interleaver 10000 can deinterleave data input through data paths of the m Rx antennas and processed by the synchronization & demodulation module on a signal block basis. In this case, if the apparatus for transmitting broadcast signals performs pair-wise interleaving as illustrated in FIG. 8, the block interleaver 10000 can process two consecutive pieces of data as a pair for each input path. Accordingly, the block interleaver 10000 can output two consecutive pieces of data even when deinterleaving has been performed. Furthermore, the block interleaver 10000 can perform a reverse operation of the interleaving operation performed by the apparatus for transmitting broadcast signals to output data in the original order.

The cell demapper 10100 can extract cells corresponding to common data, cells corresponding to data pipes and cells corresponding to PLS data from received signal frames. The cell demapper 10100 can merge data distributed and transmitted and output the same as a stream as necessary. When two consecutive pieces of cell input data are processed as a pair and mapped in the apparatus for transmitting broadcast signals, as shown in FIG. 6, the cell demapper 10100 can perform pair-wise cell demapping for processing two consecutive input cells as one unit as a reverse procedure of the mapping operation of the apparatus for transmitting broadcast signals.

In addition, the cell demapper 10100 can extract PLS signaling data received through the current frame as PLS-pre & PLS-post data and output the PLS-pre & PLS-post data.

The above-described blocks may be omitted or replaced by blocks having similar or identical functions according to design.

Figure 11:
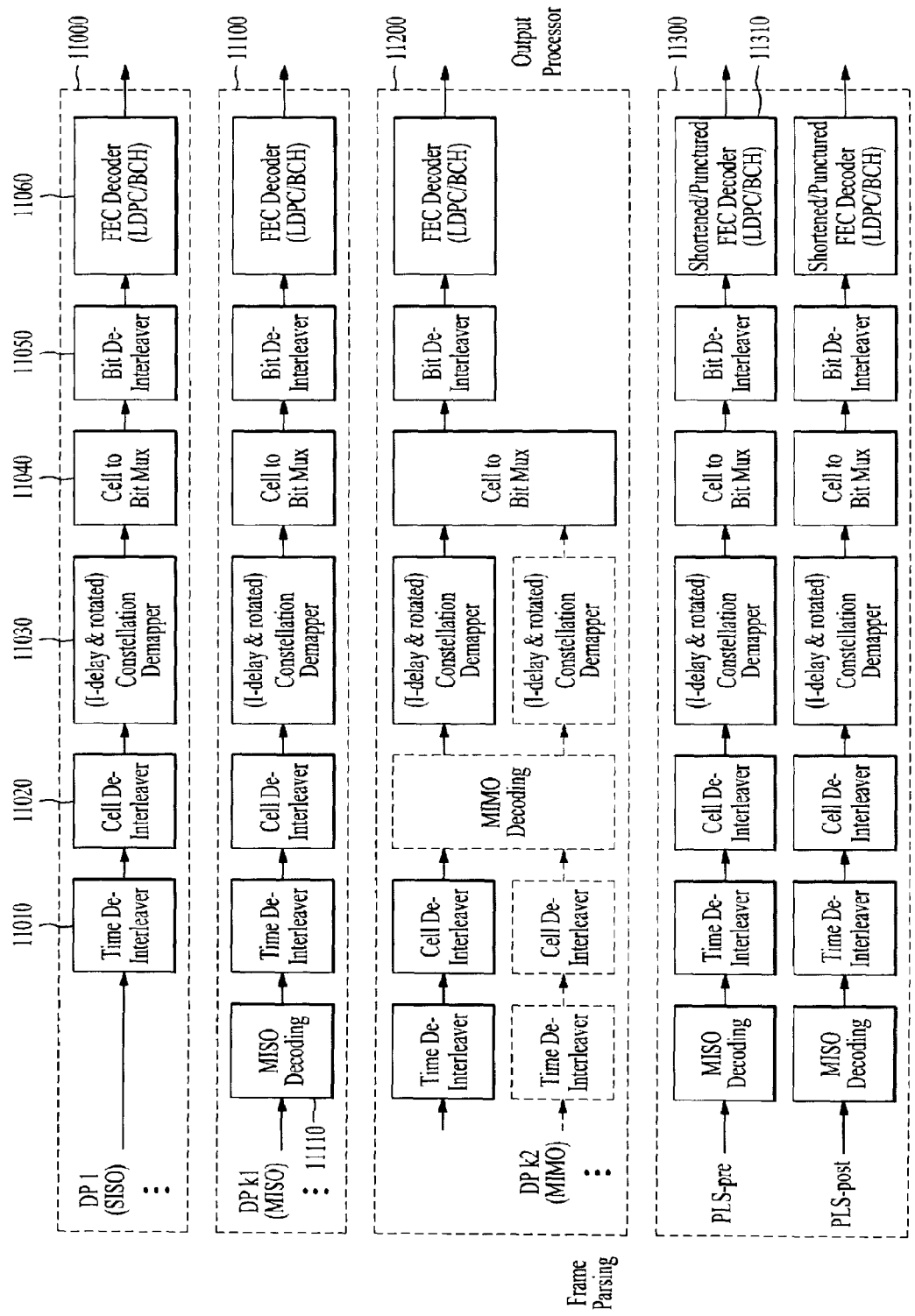
FIG. 11 illustrates a demapping & decoding module according to an embodiment of the present invention.

FIG. 11 illustrates a demapping & decoding module according to an embodiment of the present invention.

The demapping & decoding module shown in FIG. 11 corresponds to an embodiment of the demapping & decoding module illustrated in FIG. 8. The demapping & decoding module shown in FIG. 11 can perform a reverse operation of the operation of the coding & modulation module illustrated in FIG. 5.

The coding & modulation module of the apparatus for transmitting broadcast signals according to an embodiment of the present invention can process input data pipes by independently applying SISO, MISO and MIMO thereto for respective paths, as described above. Accordingly, the demapping & decoding module illustrated in FIG. 11 can include blocks for processing data output from the frame parsing module according to SISO, MISO and MIMO in response to the apparatus for transmitting broadcast signals.

As shown in FIG. 11, the demapping & decoding module according to an embodiment of the present invention can include a first block 11000 for SISO, a second block 11100 for MISO, a third block 11200 for MIMO and a fourth block 11300 for processing the PLS-pre/PLS-post information. The demapping & decoding module shown in FIG. 11 is exemplary and may include only the first block 11000 and the fourth block 11300, only the second block 11100 and the fourth block 11300 or only the third block 11200 and the fourth block 11300 according to design. That is, the demapping & decoding module can include blocks for processing data pipes equally or differently according to design.

A description will be given of each block of the demapping & decoding module.

The first block 11000 processes an input data pipe according to SISO and can include a time deinterleaver block 11010, a cell deinterleaver block 11020, a constellation demapper block 11030, a cell-to-bit mux block 11040, a bit deinterleaver block 11050 and an FEC decoder block 11060.

The time deinterleaver block 11010 can perform a reverse process of the process performed by the time interleaver block 5060 illustrated in FIG. 5. That is, the time deinterleaver block 11010 can deinterleave input symbols interleaved in the time domain into original positions thereof.

The cell deinterleaver block 11020 can perform a reverse process of the process performed by the cell interleaver block 5050 illustrated in FIG. 5. That is, the cell deinterleaver block 11020 can deinterleave positions of cells spread in one FEC block into original positions thereof.

The constellation demapper block 11030 can perform a reverse process of the process performed by the constellation mapper block 5040 illustrated in FIG. 5. That is, the constellation demapper block 11030 can demap a symbol domain input signal to bit domain data. In addition, the constellation demapper block 11030 may perform hard decision and output decided bit data. Furthermore, the constellation demapper block 11030 may output a log-likelihood ratio (LLR) of each bit, which corresponds to a soft decision value or probability value. If the apparatus for transmitting broadcast signals applies a rotated constellation in order to obtain additional diversity gain, the constellation demapper block 11030 can perform 2-dimensional LLR demapping corresponding to the rotated constellation. Here, the constellation demapper block 11030 can calculate the LLR such that a delay applied by the apparatus for transmitting broadcast signals to the I or Q component can be compensated.

The cell-to-bit mux block 11040 can perform a reverse process of the process performed by the bit-to-cell demux block 5030 illustrated in FIG. 5. That is, the cell-to-bit mux block 11040 can restore bit data mapped by the bit-to-cell demux block 5030 to the original bit streams.

The bit deinterleaver block 11050 can perform a reverse process of the process performed by the bit interleaver 5020 illustrated in FIG. 5. That is, the bit deinterleaver block 11050 can deinterleave the bit streams output from the cell-to-bit mux block 11040 in the original order.

The FEC decoder block 11060 can perform a reverse process of the process performed by the FEC encoder block 5010 illustrated in FIG. 5. That is, the FEC decoder block 11060 can correct an error generated on a transmission channel by performing LDPC decoding and BCH decoding.

The second block 11100 processes an input data pipe according to MISO and can include the time deinterleaver block, cell deinterleaver block, constellation demapper block, cell-to-bit mux block, bit deinterleaver block and FEC decoder block in the same manner as the first block 11000, as shown in FIG. 11. However, the second block 11100 is distinguished from the first block 11000 in that the second block 11100 further includes a MISO decoding block 11110. The second block 11100 performs the same procedure including time deinterleaving operation to outputting operation as the first block 11000 and thus description of the corresponding blocks is omitted.

The MISO decoding block 11110 can perform a reverse operation of the operation of the MISO processing block 5110 illustrated in FIG. 5. If the broadcast transmission/reception system according to an embodiment of the present invention uses STBC, the MISO decoding block 11110 can perform Alamouti decoding.

The third block 11200 processes an input data pipe according to MIMO and can include the time deinterleaver block, cell deinterleaver block, constellation demapper block, cell-to-bit mux block, bit deinterleaver block and FEC decoder block in the same manner as the second block 11100, as shown in FIG. 11. However, the third block 11200 is distinguished from the second block 11100 in that the third block 11200 further includes a MIMO decoding block 11210. The basic roles of the time deinterleaver block, cell deinterleaver block, constellation demapper block, cell-to-bit mux block and bit deinterleaver block included in the third block 11200 are identical to those of the corresponding blocks included in the first and second blocks 11000 and 11100 although functions thereof may be different from the first and second blocks 11000 and 11100.

The MIMO decoding block 11210 can receive output data of the cell deinterleaver for input signals of the m Rx antennas and perform MIMO decoding as a reverse operation of the operation of the MIMO processing block 5220 illustrated in FIG. 5. The MIMO decoding block 11210 can perform maximum likelihood decoding to obtain optimal decoding performance or carry out sphere decoding with reduced complexity. Otherwise, the MIMO decoding block 11210 can achieve improved decoding performance by performing MMSE detection or carrying out iterative decoding with MMSE detection.

The fourth block 11300 processes the PLS-pre/PLS-post information and can perform SISO or MISO decoding. The fourth block 11300 can carry out a reverse process of the process performed by the fourth block 5300 described with reference to FIG. 5.

The basic roles of the time deinterleaver block, cell deinterleaver block, constellation demapper block, cell-to-bit mux block and bit deinterleaver block included in the fourth block 11300 are identical to those of the corresponding blocks of the first, second and third blocks 11000, 11100 and 11200 although functions thereof may be different from the first, second and third blocks 11000, 11100 and 11200.

The shortened/punctured FEC decoder 11310 included in the fourth block 11300 can perform a reverse process of the process performed by the shortened/punctured FEC encoder block 5310 described with reference to FIG. 5. That is, the shortened/punctured FEC decoder 11310 can perform de-shortening and de-puncturing on data shortened/punctured according to PLS data length and then carry out FEC decoding thereon. In this case, the FEC decoder used for data pipes can also be used for PLS. Accordingly, additional FEC decoder hardware for the PLS only is not needed and thus system design is simplified and efficient coding is achieved.

The above-described blocks may be omitted or replaced by blocks having similar or identical functions according to design.

The demapping & decoding module according to an embodiment of the present invention can output data pipes and PLS information processed for the respective paths to the output processor, as illustrated in FIG. 11.

Figure 12:
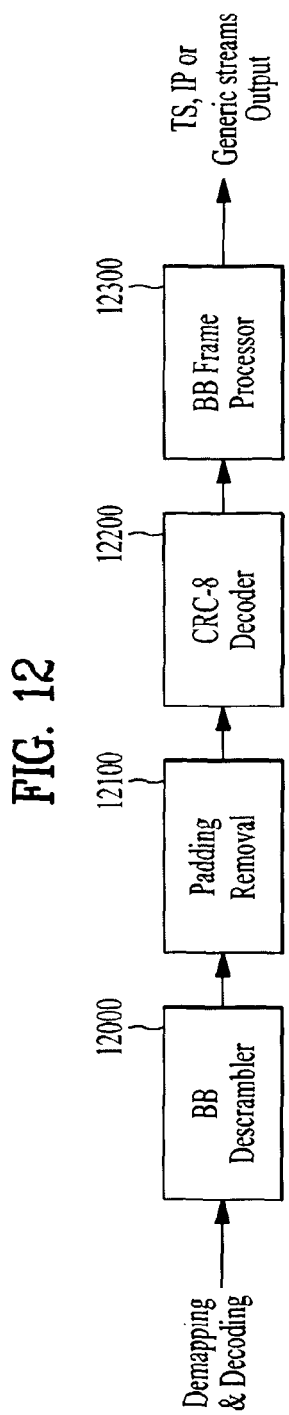
FIG. 12 illustrates an output processor according to an embodiment of the present invention.
Figure 13:
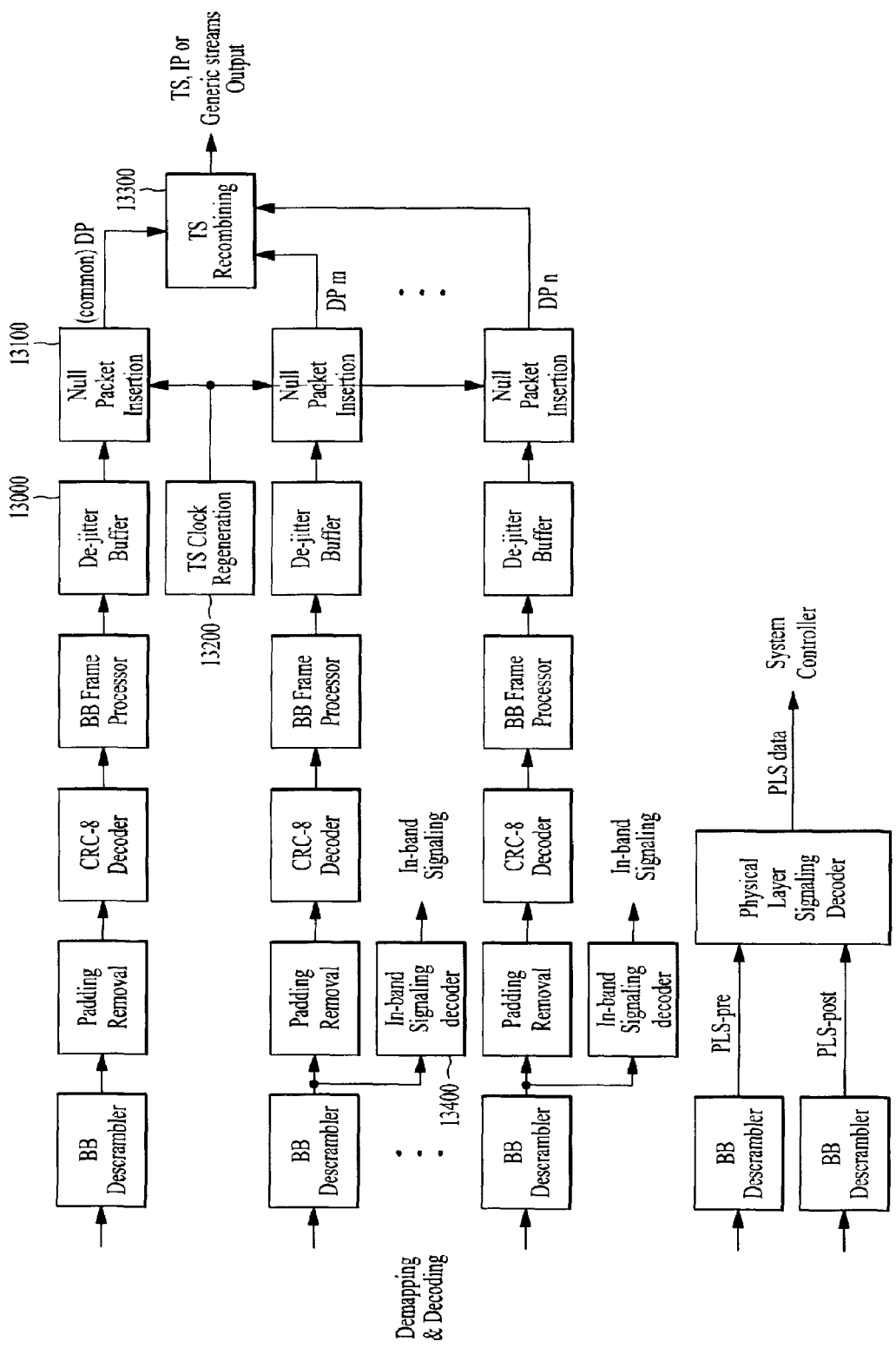
FIG. 13 illustrates an output processor according to another embodiment of the present invention.

FIGS. 12 and 13 illustrate output processors according to embodiments of the present invention.

FIG. 12 illustrates an output processor according to an embodiment of the present invention. The output processor illustrated in FIG. 12 corresponds to an embodiment of the output processor illustrated in FIG. 8. The output processor illustrated in FIG. 12 receives a single data pipe output from the demapping & decoding module and outputs a single output stream. The output processor can perform a reverse operation of the operation of the input formatting module illustrated in FIG. 2.

The output processor shown in FIG. 12 can include a BB scrambler block 12000, a padding removal block 12100, a CRC-8 decoder block 12200 and a BB frame processor block 12300.

The BB scrambler block 12000 can descramble an input bit stream by generating the same PRBS as that used in the apparatus for transmitting broadcast signals for the input bit stream and carrying out an XOR operation on the PRBS and the bit stream.

The padding removal block 12100 can remove padding bits inserted by the apparatus for transmitting broadcast signals as necessary.

The CRC-8 decoder block 12200 can check a block error by performing CRC decoding on the bit stream received from the padding removal block 12100.

The BB frame processor block 12300 can decode information transmitted through a BB frame header and restore MPEG-TSs, IP streams (v4 or v6) or generic streams using the decoded information.

The above-described blocks may be omitted or replaced by blocks having similar or identical functions according to design.

FIG. 13 illustrates an output processor according to another embodiment of the present invention. The output processor shown in FIG. 13 corresponds to an embodiment of the output processor illustrated in FIG. 8. The output processor shown in FIG. 13 receives multiple data pipes output from the demapping & decoding module. Decoding multiple data pipes can include a process of merging common data commonly applicable to a plurality of data pipes and data pipes related thereto and decoding the same or a process of simultaneously decoding a plurality of services or service components (including a scalable video service) by the apparatus for receiving broadcast signals.

The output processor shown in FIG. 13 can include a BB descrambler block, a padding removal block, a CRC-8 decoder block and a BB frame processor block as the output processor illustrated in FIG. 12. The basic roles of these blocks correspond to those of the blocks described with reference to FIG. 12 although operations thereof may differ from those of the blocks illustrated in FIG. 12.

A de-jitter buffer block 13000 included in the output processor shown in FIG. 13 can compensate for a delay, inserted by the apparatus for transmitting broadcast signals for synchronization of multiple data pipes, according to a restored TTO (time to output) parameter.

A null packet insertion block 13100 can restore a null packet removed from a stream with reference to a restored DNP (deleted null packet) and output common data.

A TS clock regeneration block 13200 can restore time synchronization of output packets based on ISCR (input stream time reference) information.

A TS recombining block 13300 can recombine the common data and data pipes related thereto, output from the null packet insertion block 13100, to restore the original MPEG-TSs, IP streams (v4 or v6) or generic streams. The TTO, DNT and ISCR information can be obtained through the BB frame header.

An in-band signaling decoding block 13400 can decode and output in-band physical layer signaling information transmitted through a padding bit field in each FEC frame of a data pipe.

The output processor shown in FIG. 13 can BB-descramble the PLS-pre information and PLS-post information respectively input through a PLS-pre path and a PLS-post path and decode the descrambled data to restore the original PLS data. The restored PLS data is delivered to a system controller included in the apparatus for receiving broadcast signals. The system controller can provide parameters necessary for the synchronization & demodulation module, frame parsing module, demapping & decoding module and output processor module of the apparatus for receiving broadcast signals.

The above-described blocks may be omitted or replaced by blocks having similar r identical functions according to design.

Figure 14:
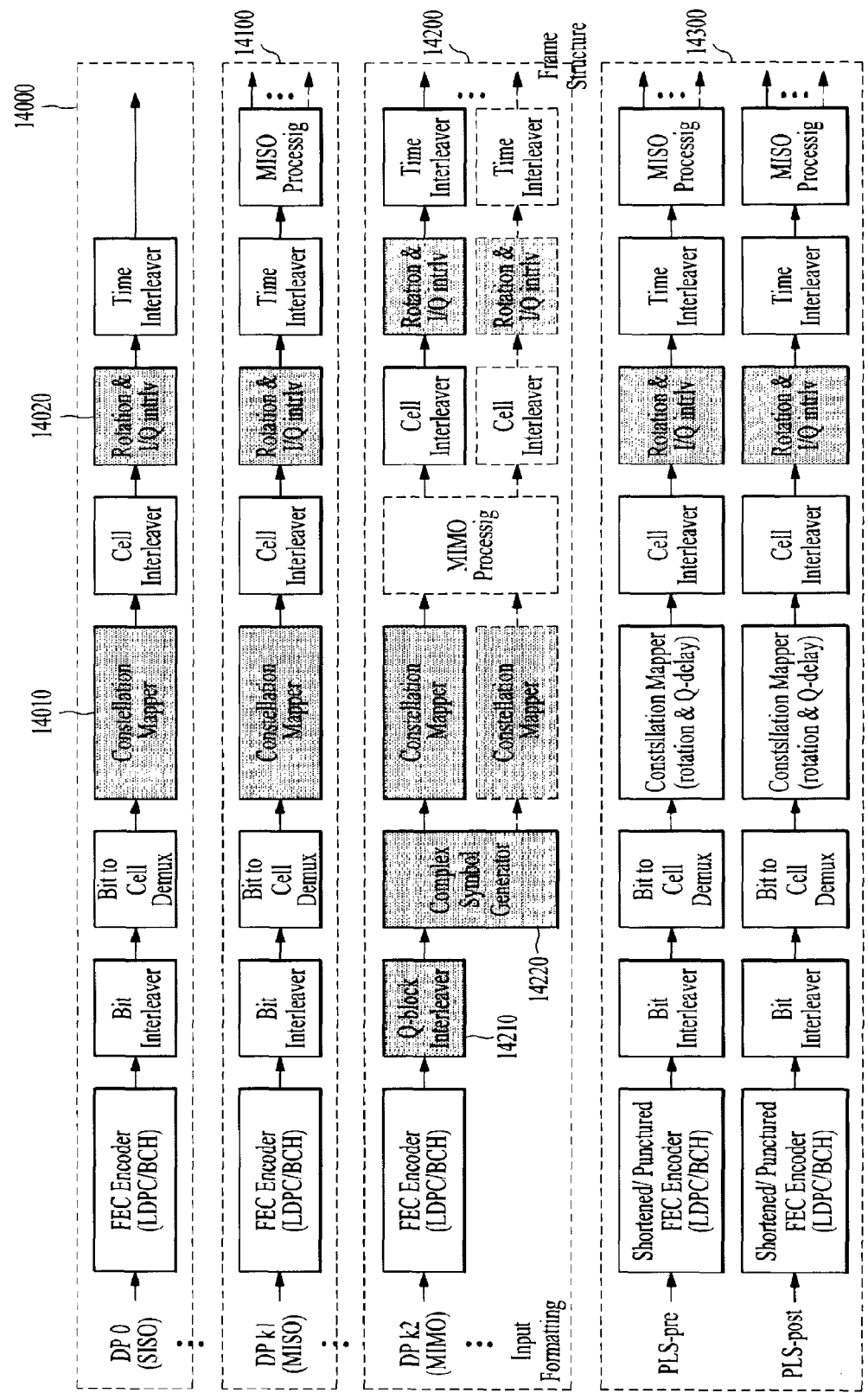
FIG. 14 illustrates a coding & modulation module according to another embodiment of the present invention.

FIG. 14 illustrates a coding & modulation module according to another embodiment of the present invention.

The coding & modulation module shown in FIG. 14 corresponds to another embodiment of the coding & modulation module illustrated in FIGS. 1 to 5.

To control QoS for each service or service component transmitted through each data pipe, as described above with reference to FIG. 5, the coding & modulation module shown in FIG. 14 can include a first block 14000 for SISO, a second block 14100 for MISO, a third block 14200 for MIMO and a fourth block 14300 for processing the PLS-pre/PLS-post information. In addition, the coding & modulation module can include blocks for processing data pipes equally or differently according to the design. The first to fourth blocks 14000 to 14300 shown in FIG. 14 are similar to the first to fourth blocks 5000 to 5300 illustrated in FIG. 5.

However, the first to fourth blocks 14000 to 14300 shown in FIG. 14 are distinguished from the first to fourth blocks 5000 to 5300 illustrated in FIG. 5 in that a constellation mapper 14010 included in the first to fourth blocks 14000 to 14300 has a function different from the first to fourth blocks 5000 to 5300 illustrated in FIG. 5, a rotation & I/Q interleaver block 14020 is present between the cell interleaver and the time interleaver of the first to fourth blocks 14000 to 14300 illustrated in FIG. 14 and the third block 14200 for MIMO has a configuration different from the third block 5200 for MIMO illustrated in FIG. 5. The following description focuses on these differences between the first to fourth blocks 14000 to 14300 shown in FIG. 14 and the first to fourth blocks 5000 to 5300 illustrated in FIG. 5.

The constellation mapper block 14010 shown in FIG. 14 can map an input bit word to a complex symbol. However, the constellation mapper block 14010 may not perform constellation rotation, differently from the constellation mapper block shown in FIG. 5. The constellation mapper block 14010 shown in FIG. 14 is commonly applicable to the first, second and third blocks 14000, 14100 and 14200, as described above.

The rotation & I/Q interleaver block 14020 can independently interleave in-phase and quadrature-phase components of each complex symbol of cell-interleaved data output from the cell interleaver and output the in-phase and quadrature-phase components on a symbol-by-symbol basis. The number of number of input data pieces and output data pieces of the rotation & I/Q interleaver block 14020 is two or more which can be changed by the designer. In addition, the rotation & I/Q interleaver block 14020 may not interleave the in-phase component.

The rotation & I/Q interleaver block 14020 is commonly applicable to the first to fourth blocks 14000 to 14300, as described above. In this case, whether or not the rotation & I/Q interleaver block 14020 is applied to the fourth block 14300 for processing the PLS-pre/post information can be signaled through the above-described preamble.

The third block 14200 for MIMO can include a Q-block interleaver block 14210 and a complex symbol generator block 14220, as illustrated in FIG. 14.

The Q-block interleaver block 14210 can permute a parity part of an FEC-encoded FEC block received from the FEC encoder. Accordingly, a parity part of an LDPC H matrix can be made into a cyclic structure like an information part. The Q-block interleaver block 14210 can permute the order of output bit blocks having Q size of the LDPC H matrix and then perform row-column block interleaving to generate final bit streams.

The complex symbol generator block 14220 receives the bit streams output from the Q-block interleaver block 14210, maps the bit streams to complex symbols and outputs the complex symbols. In this case, the complex symbol generator block 14220 can output the complex symbols through at least two paths. This can be modified by the designer.

The above-described blocks may be omitted or replaced by blocks having similar or identical functions according to design.

The coding & modulation module according to another embodiment of the present invention, illustrated in FIG. 14, can output data pipes, PLS-pre information and PLS-post information processed for respective paths to the frame structure module.

Figure 15:
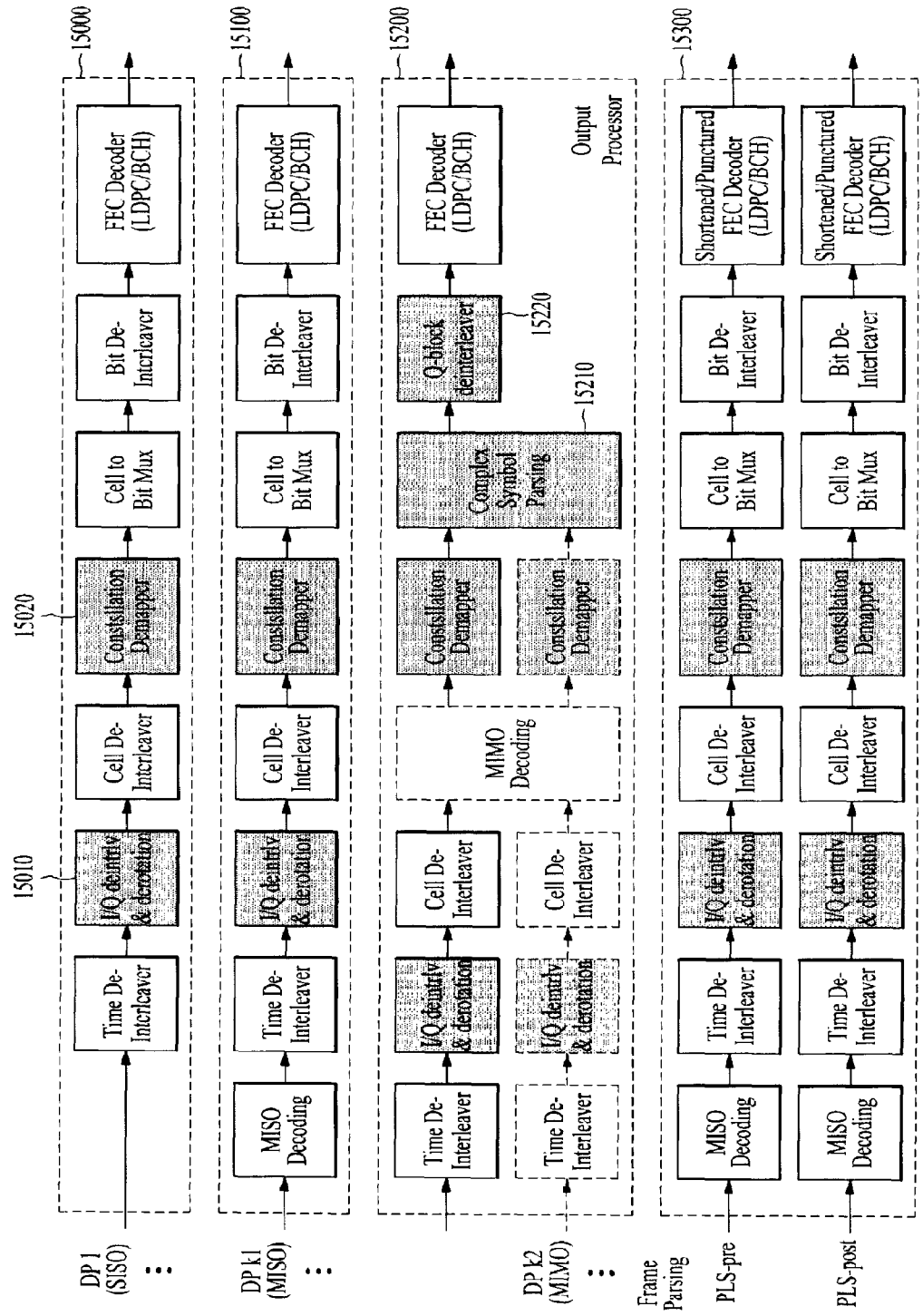
FIG. 15 illustrates a demapping & decoding module according to another embodiment of the present invention.

FIG. 15 illustrates a demapping & decoding module according to another embodiment of the present invention.

The demapping & decoding module shown in FIG. 15 corresponds to another embodiment of the demapping & decoding module illustrated in FIG. 11. The demapping & decoding module shown in FIG. 15 can perform a reverse operation of the operation of the coding & modulation module illustrated in FIG. 14.

As shown in FIG. 15, the demapping & decoding module according to another embodiment of the present invention can include a first block 15000 for SISO, a second block 11100 for MISO, a third block 15200 for MIMO and a fourth block 14300 for processing the PLS-pre/PLS-post information. In addition, the demapping & decoding module can include blocks for processing data pipes equally or differently according to design. The first to fourth blocks 15000 to 15300 shown in FIG. 15 are similar to the first to fourth blocks 11000 to 11300 illustrated in FIG. 11.

However, the first to fourth blocks 15000 to 15300 shown in FIG. 15 are distinguished from the first to fourth blocks 11000 to 11300 illustrated in FIG. 11 in that an I/Q deinterleaver and derotation block 15010 is present between the time interleaver and the cell deinterleaver of the first to fourth blocks 15000 to 15300, a constellation mapper 15010 included in the first to fourth blocks 15000 to 15300 has a function different from the first to fourth blocks 11000 to 11300 illustrated in FIG. 11 and the third block 15200 for MIMO has a configuration different from the third block 11200 for MIMO illustrated in FIG. 11. The following description focuses on these differences between the first to fourth blocks 15000 to 15300 shown in FIG. 15 and the first to fourth blocks 11000 to 11300 illustrated in FIG. 11.

The I/Q deinterleaver & derotation block 15010 can perform a reverse process of the process performed by the rotation & I/Q interleaver block 14020 illustrated in FIG. 14. That is, the I/Q deinterleaver & derotation block 15010 can deinterleave I and Q components I/Q-interleaved and transmitted by the apparatus for transmitting broadcast signals and derotate complex symbols having the restored I and Q components.

The I/Q deinterleaver & derotation block 15010 is commonly applicable to the first to fourth blocks 15000 to 15300, as described above. In this case, whether or not the I/Q deinterleaver & derotation block 15010 is applied to the fourth block 15300 for processing the PLS-pre/post information can be signaled through the above-described preamble.

The constellation demapper block 15020 can perform a reverse process of the process performed by the constellation mapper block 14010 illustrated in FIG. 14. That is, the constellation demapper block 15020 can demap cell-deinterleaved data without performing derotation.

The third block 15200 for MIMO can include a complex symbol parsing block 15210 and a Q-block deinterleaver block 15220, as shown in FIG. 15.

The complex symbol parsing block 15210 can perform a reverse process of the process performed by the complex symbol generator block 14220 illustrated in FIG. 14. That is, the complex symbol parsing block 15210 can parse complex data symbols and demap the same to bit data. In this case, the complex symbol parsing block 15210 can receive complex data symbols through at least two paths.

The Q-block deinterleaver block 15220 can perform a reverse process of the process carried out by the Q-block interleaver block 14210 illustrated in FIG. 14. That is, the Q-block deinterleaver block 15220 can restore Q size blocks according to row-column deinterleaving, restore the order of permuted blocks to the original order and then restore positions of parity bits to original positions according to parity deinterleaving.

The above-described blocks may be omitted or replaced by blocks having similar or identical functions according to design.

As illustrated in FIG. 15, the demapping & decoding module according to another embodiment of the present invention can output data pipes and PLS information processed for respective paths to the output processor.

As described above, the apparatus and method for transmitting broadcast signals according to an embodiment of the present invention can multiplex signals of different broadcast transmission/reception systems within the same RF channel and transmit the multiplexed signals and the apparatus and method for receiving broadcast signals according to an embodiment of the present invention can process the signals in response to the broadcast signal transmission operation. Accordingly, it is possible to provide a flexible broadcast transmission and reception system.

Figure 16:
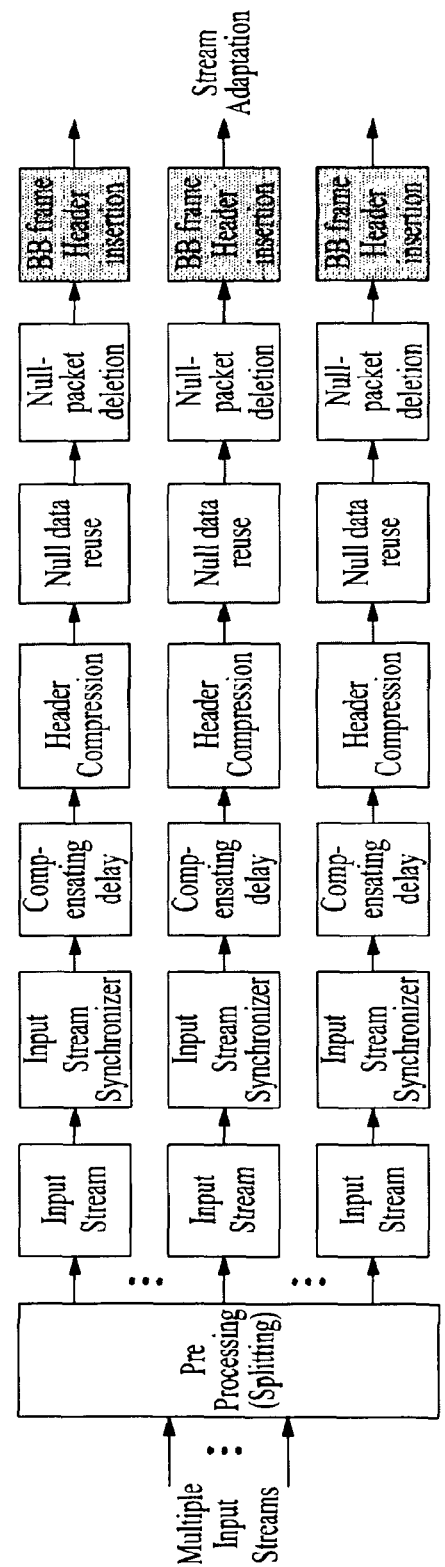
FIG. 16 is a view illustrating a mode adaptation module according to another embodiment of the present invention.

FIG. 16 is a view illustrating a mode adaptation module according to another embodiment of the present invention.

The above-described input formatting module may include a mode adaptation module as described above. The mode adaptation module according to the current embodiment of the present invention may be slightly different from the above-described mode adaptation module as illustrated in FIG. 16.

The mode adaptation module according to the current embodiment may include a preprocessing block, input interface blocks, input stream synchronizer blocks, compensating delay blocks, header compression blocks, null data reuse blocks, null packet deletion blocks and/or BB frame header insertion blocks.

Here, the input interface blocks, the input stream synchronizer blocks, the compensating delay blocks and the null packet deletion blocks may perform the same operations as those of the above-described mode adaptation module.

The preprocessing block may split or demultiplex multiple input streams into multiple data pipes. Here, the data pipes may also be called Physical Layer Pipes (PLPs). At this time, the input streams may be in the form of TS (MPEG2-TS), IP (Internet protocol) and/or GS (Generic stream). Other types of input streams may also be used according to embodiments.

The header compression block may compress a packet header. This serves to increase the transmission efficiency of a TS or IP input stream. Since a receiver already has a priori information of the header, known data may be deleted by a transmitter. For example, information such as a PID may be compressed and other types of information may be deleted or replaced. According to another embodiment, the header compression block may be located next to the null packet deletion block.

The null data reuse block may insert null data into a packet after header compression. This block may be omitted according to an embodiment.

The BB frame header insertion block according to the current embodiment may operate differently from the above-described BB frame header insertion block. The present invention proposes a data field length signaling reduction method of a Base Band (BB) frame. This method may be performed by the BB frame header insertion block according to the current embodiment. A BB frame and a BB frame header may be configured using the method proposed by the present invention. The present invention relates to a BB frame generation procedure for processing and delivering an input stream to an FEC block. The method proposed by the present invention may be a method for increasing transmission efficiency by reducing overhead of a BB frame header. A detailed description of the BB frame header insertion block will be given below.

In a related art, a BB frame allocates a data field length (DFL) to every BB frame header to report the length of a data field to a receiver. This DFL may be 16 bits or 11 bits. As such, overhead is high in the related art.

In a BB frame having a fixed size, the length of a data field may differ if the BB frame is not completely filled with data or if the BB frame includes in-band signaling information.

In another related art, a BB frame transmits only an indicator instead of directly reporting the length of a data field. Further, the BB frame signals the length of padding of the BB frame, in the padding. However, in this case, in-band signaling is not considered and thus restrictions may be caused when in-band signaling is used.

The method proposed by the present invention may be a BB frame header configuration method for reducing DFL and inserting an additional field. Here, the additional field may indicate the type of in-band signaling or be used for another purpose. Using the method proposed by the present invention, overhead may be minimized and various functions may be added to padding (or stuffing).

Figure 17:
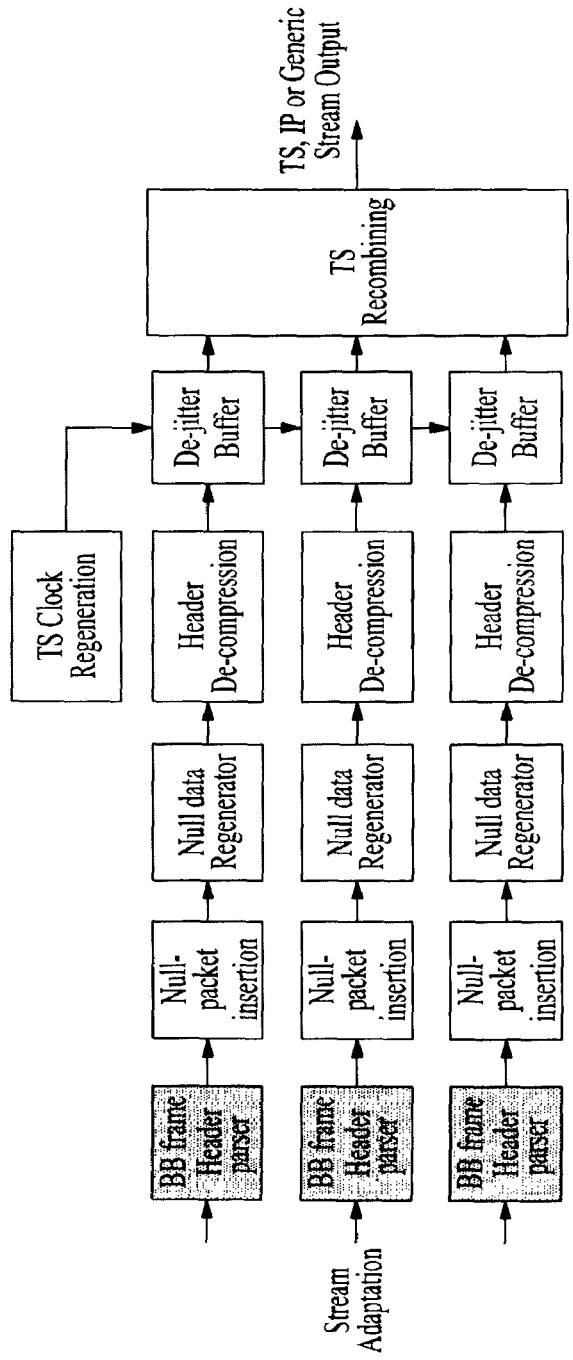
FIG. 17 is a view illustrating an output processor according to another embodiment of the present invention.

FIG. 17 is a view illustrating an output processor according to another embodiment of the present invention.

The above-described output processor may include a BB frame header parser block as described above. The output processor according to the current embodiment of the present invention may be slightly different from the above-described output processor as illustrated in FIG. 17.

The output processor according to the current embodiment of the present invention may include BB frame header parser blocks, null packet insertion blocks, null data regenerator blocks, header de-compression blocks, a TS clock regeneration block, de-jitter buffer blocks and/or a TS recombining block.

Here, the null packet insertion blocks, the TS clock regeneration block, the de-jitter buffer blocks and the TS recombining block may perform the same operations as those of the above-described output processor.

The BB frame header configuration method proposed by the present invention may correspond to the BB frame header parser block at a receiver. The BB frame header parser block according to the current embodiment may operate differently from the above-described BB frame header parser block. The BB frame header parser block according to the current embodiment may parse a header of a BB frame according to the method proposed by the present invention. A detailed description of a BB frame and BB frame header configuration method proposed by the present invention will be given below.

The null data regenerator block may be a component corresponding to the null data reuse block of a transmitter. The null data regenerator block may output an output thereof to the header de-compression block. This block may be omitted according to an embodiment.

The header de-compression block may be a component corresponding to the header compression block of a transmitter. The header de-compression block may de-compress a compressed packet header. As described above, the packet header may have been compressed to increase the transmission efficiency of a TS or IP input stream. According to another embodiment, the header de-compression block may be located prior to the null packet insertion block.

Figure 18:
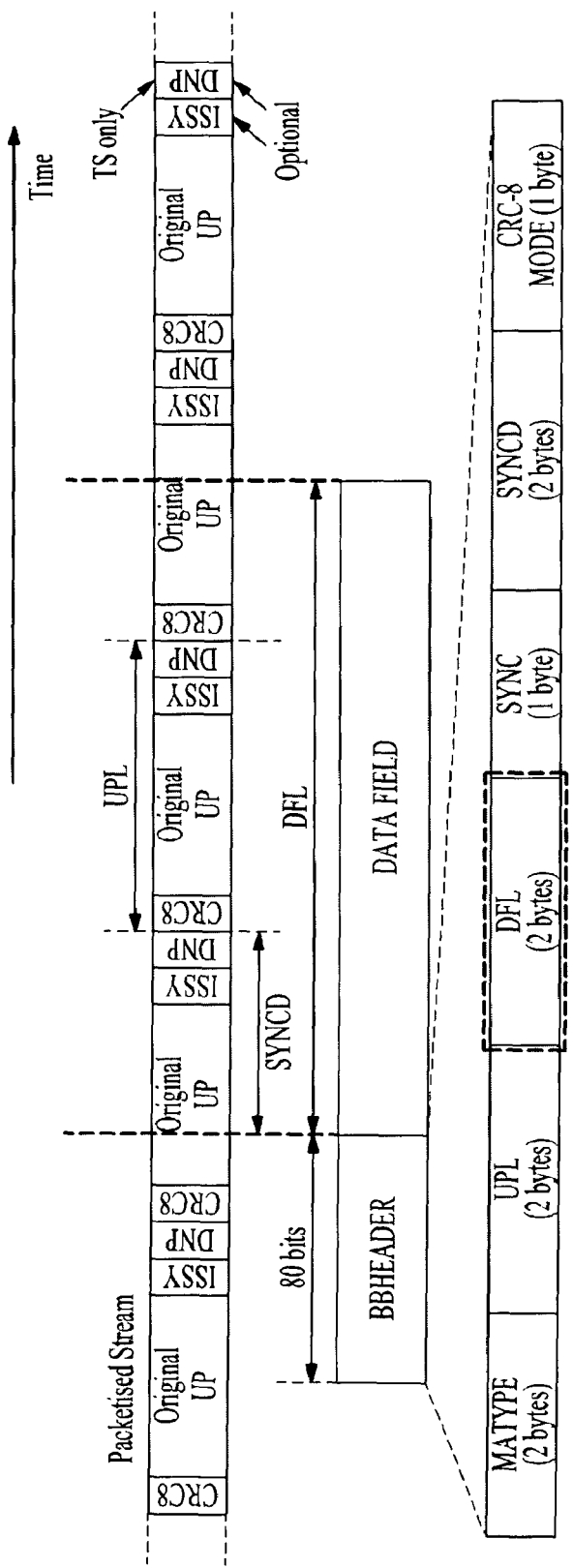
FIG. 18 is a view illustrating a BB frame generation procedure according to a related art.

FIG. 18 is a view illustrating a BB frame generation procedure according to a related art.

An input data stream may be split to an appropriate length to be processable by FEC. A BB frame may be generated using the split data stream.

A value obtained by subtracting the length of a BB frame header from a total length of the BB frame may correspond to the length of a data field. Actual user packets (UPs) may be inserted into this data field. The length of the data field may be indicated by a DFL field of the BB frame header. The DFL field may also be called DFL.

Then, the BB frame may be encoded by a preset FEC block. The total length of the BB frame may be fixed. The length of the data field may differ if the UPs are insufficient and thus do not completely fill the BB frame or if in-band signaling information is included intentionally. When the BB frame is not completely filled, the empty space may be filled with stuffing.

Figure 19:
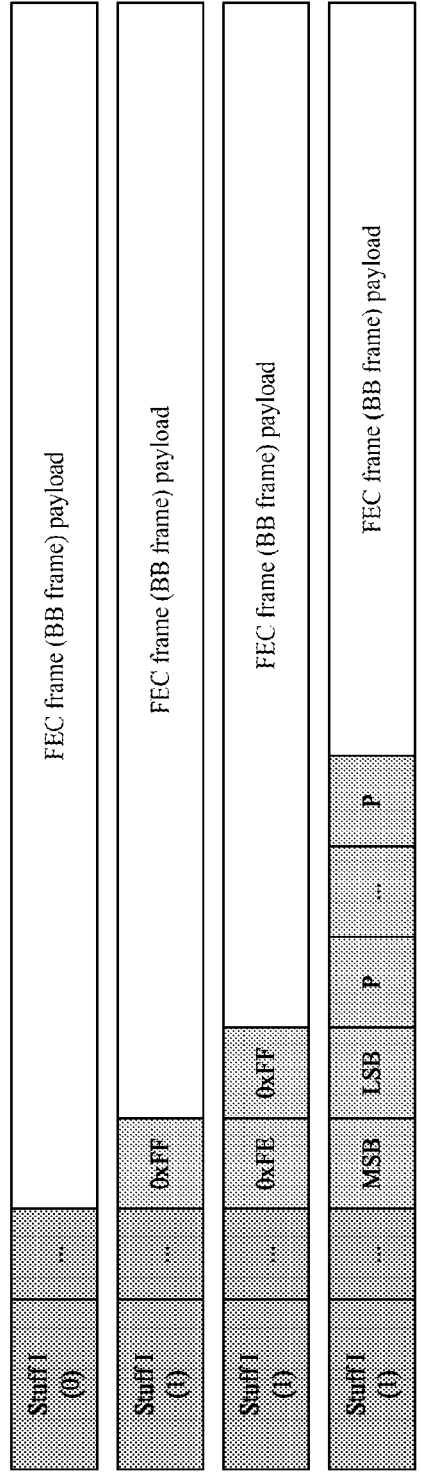
FIG. 19 is a view illustrating a BB frame generation procedure according to another related art.

FIG. 19 is a view illustrating a BB frame generation procedure according to another related art.

In the other related art, when a frame is not completely filled with data to be transmitted, stuffing bytes may also be inserted. STUFFI may be inserted into a TP header to signal these stuffing bytes. The TP header may be the same concept as a BB frame header.

If a BB frame is completely filled with UPs, no stuffing byte may exist. In this case, STUFFI may be set to 0.

If a BB frame is not completely filled with UPs, stuffing bytes may exist. In this case, STUFFI may be set to 1.

The first byte of a payload of the frame is checked to detect the number of inserted stuffing bytes. If the first byte has a value of 0xFF, this may indicate 1 stuffing byte. If the first two bytes respectively have values of 0xFE and 0xFF, this may indicate 2 stuffing bytes. When the number of stuffing bytes is 3 or more, the length of stuffing bytes may be signaled using the values of the first two bytes respectively as MSBs and LSBs.

In the table of FIG. 19, N may denote a total length of stuffing bytes. If N is 1 byte, the length of a field indicating the total length of stuffing bytes may be 1 byte. This may have a value of 0xFF as described above. In this case, no more stuffing bytes follow 0xFF because N is 1 byte.

If N is 2 bytes, the length of the field indicating the total length of stuffing bytes may be 2 bytes. These may have values of 0xFE and 0xFF as described above. No more stuffing bytes may follow 0xFE and 0xFF because N is 2 bytes.

If N is 3 or more bytes, i.e., if N has a value between 3 and 65278, the length of the field indicating the total length of stuffing bytes may also be 2 bytes. As described above, these 2 bytes may be MSBs and LSBs. The total length of stuffing bytes may be signaled using these 2 bytes. Additional stuffing bytes may follow the MSBs and LSBs. Since the total length of stuffing bytes is N and the length of the MSBs and LSBs is 2 bytes, the length of following stuffing bytes may be N−2 bytes.

Figure 20:
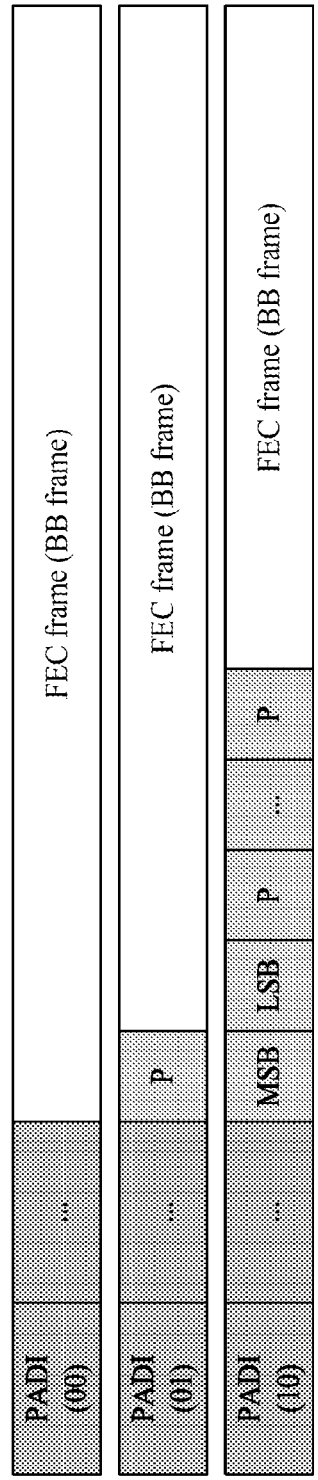
FIG. 20 is a view illustrating a BB frame generation procedure according to a still other related art.

FIG. 20 is a view illustrating a BB frame generation procedure according to a still other related art.

In the still other related art, an indicator of 2 bits may be used to indicate the state of stuffing bytes. This indicator may be called PADI.

If stuffing bytes, i.e., padding, do not exist, PADI may be set to 00. In the first BB frame of FIG. 20, since the value of PADI is 00, no padding exists.

If PADI is 01, this may indicate that padding is 1 byte. In the second BB frame of FIG. 20, since the value of PADI is 01, 1 byte exists as padding (P denotes a padding byte).

If PADI is 10, this may indicate that 2 or more padding bytes exist. In this case, a padding field may signal the length of padding using, for example, MSBs and LSBs. In the third BB frame of FIG. 20, since the value of PADI is 10, the first two bytes of the padding field are allocated as MSBs and LSBs. A padding field marked as P may be located next to the MSBs and LSBs.

If PADI is 11, this may indicate a reserved state.

FIG. 21 is a view illustrating a BB frame configuration method according to an embodiment of the present invention.

The present invention proposes the following method to configure a BB frame and a BB frame header.

Initially, a BB frame may include a BB frame header, a stuffing field and/or a payload. According to an embodiment, the stuffing field and the payload may also be called a BB frame payload.

The BB frame header may describe the format of the payload, i.e., data field. Information such as DNP or ISSY related information may be additionally inserted prior to the stuffing field. The payload may refer to a data field.

The BB frame header may include a STUFFI field. The STUFFI field may function as a stuffing indicator. The STUFFI field may be 1 bit. STUFFI may describe whether a stuffing field exists in the BB frame. The location of STUFFI may vary according to embodiments.

If the value of STUFFI is 0, the BB frame may include no stuffing field and no in-band signaling field. That is, in this case, the entire payload may be used to transmit UPs.

If the value of STUFFI is 1, the BB frame may include a stuffing field or an in-band signaling field. That is, in this case, an information, padding or in-band field other than UPs may exist in the payload.

According to an embodiment of the present invention, the meanings of 0 and 1 as the values of STUFFI may be switched.

The stuffing field may include a stuffing field header and/or a stuffing data region. Here, the stuffing data region may include stuffing data and/or in-band signaling information.

The stuffing field header may be 2 bytes according to an embodiment. The stuffing field header may include PAD_ONE, PAD_TYPE and/or PAD_LEN.

Here, the first byte of FIG. 21 may refer to the first byte of the stuffing field. The second byte of FIG. 21 may also belong to the stuffing field. According to an embodiment, the first two bytes may correspond to the stuffing field header. According to an embodiment, bytes from the third byte may be included in the stuffing data region or the payload.

PAD_ONE may be called STUFF_ONE according to another embodiment. If STUFFI is 1, this may indicate STUFF_ONE. STUFF_ONE may indicate whether the length of stuffing bytes is 1 byte or not. STUFF_ONE may be an MSB of 1 bit. If STUFF_ONE is 1, the length of stuffing bytes may be 1 byte. In this case, STUFF_LEN_LSB indicating the length of stuffing bytes may not be used. Further, all STUFF_LEN_MSBs may be set to 0. In this case, according to another embodiment, all STUFF_LEN_MSBs may be set to 1. That is, according to an embodiment, 1 stuffing byte may have a value of 00000000, 11111111, 10000000 or 01111111.

If STUFF_ONE is 0, the length of stuffing bytes may be greater than 1 byte. In this case, the stuffing field header of 2 bytes may be used to indicate the length and type of the stuffing data region.

The meanings of the values of STUFF_ONE may be switched according to a designer. That is, the meanings of 1 and 0 may be switched.

STUFF_ONE (PAD_ONE) of FIG. 21 may be located at the first bit of the first byte. This location is variable according to embodiments. STUFF_ONE may be located in the BB frame header according to another embodiment.

According to another embodiment, a single 2-bit field functioning as STUFFI and STUFF_ONE may be configured. Since each of STUFFI and STUFF_ONE has 1 bit, a single 2-bit field may be configured as a substitute therefor. This field may be located in the BB frame header or the stuffing field.

PAD_LEN may be called STUFF_LEN according to another embodiment. STUFF_LEN may be divided into STUFF_LEN_MSB and/or STUFF_LEN_LSB. STUFF_LEN_MSB and STUFF_LEN_LSB may be a field of 5 bits and a field of 8 bits, respectively. These two fields may be used to indicate a total length of the stuffing field. According to another embodiment, the lengths of STUFF_LEN_MSB and STUFF_LEN_LSB may be switched, e.g., 8 bits and 5 bits. Further, according to another embodiment, the locations of the two may also be switched. According to an embodiment, a field indicating the length of padding may be located in the stuffing data region.

In a conventional case, the length of padding is indicated using the first 2 bytes. However, if 64K LDPC is used, the length of padding is up to 6370 bytes (64 k, 5/6 code rate, BCH code). Thus, the length of padding may be sufficiently indicated using 13 bits ($2^{13}$=8192 bytes). Accordingly, PAD_LEN may be 13 (5+8) bits in the present invention.

If the length of padding is indicated using 13 bits as described above, the first 2 bytes may have 2 extra bits. In the present invention, these two extra bits are allocated as PAD_TYPE to signal the type of a padding region if the padding region is used for another purpose (e.g., in-band signaling).

PAD_TYPE may be called STUFF_TYPE according to another embodiment. STUFF_TYPE is a field of 2 bits as described above and may indicate the type of the stuffing data (or stuffing data region). In the case of 00, the stuffing data region may include the stuffing data only. In the case of 01, specific-type in-band signaling information may be included together with the stuffing data in the stuffing data region. In the case of 10, another-type in-band signaling information may be included together with the stuffing data in the stuffing data region. In the case of 11, both the specific-type in-band signaling information and the other-type in-band signaling information may be included together with the stuffing data in the stuffing data region.

Here, the specific-type in-band signaling information may refer to in-band A and the other-type in-band signaling information may refer to in-band B. However, this is merely exemplary and the types indicated by the values of STUFF_TYPE may be changed. Further, STUFF_TYPE may indicate the configuration of the BB frame or the payload. For example, STUFF_TYPE may indicate the first full packet of the payload, which is not cut.

If the stuffing field is signaled as described above according to the present invention, in-band signaling may be inserted into a plurality of other frames. Further, distinction from padding only with no in-band signaling is possible.

STUFF_TYPE may be located in the BB frame header according to an embodiment. Alternatively, STUFF_TYPE may be located in the stuffing field as in the current embodiment. The length of STUFF_TYPE may be changed according to embodiments.

The meanings of the values of STUFF_TYPE may be switched according to a designer. For example, the meaning of 00 and the meaning of 11 may be switched. Further, the meaning of 10 and the meaning of 01 may be switched.

The stuffing data may be all 0s or all 1s.

FIG. 21 illustrates Case #1 to Case #6 of the BB frame configuration method proposed by the present invention. A description is now given of each case.

Case #1 may be a case in which only data exists and stuffing data and in-band signaling do not exist in the BB frame. In this case, STUFFI may have a value of 0. Accordingly, the BB frame may not have a stuffing field and a data region, i.e., payload, may be located immediately next to the BB frame header.

Case #2 may be a case in which a stuffing field of 1 byte exists and in-band signaling does not exist in the BB frame. In this case, STUFFI may have a value of 1 because the stuffing field exists in the BB frame. This stuffing field may have a size of 1 byte. The first bit of the stuffing field is a STUFF_ONE field and has a value of 1 because the size of the stuffing field is 1 byte. The remaining 7 bits of the stuffing field may have a value of 0000000 as described above. In this case, the value of the whole stuffing field may be 10000000. FIG. 21 illustrates that the remaining 7 bits have a value of 1111111 according to another embodiment. That is, in this case, the value of the whole stuffing field may be 11111111. A data region, i.e., payload, may be located next to the stuffing field.

Case #3 may be a case in which a stuffing field having a size greater than 1 byte exists and in-band signaling does not exist in the BB frame. Here, the stuffing field may be 2 or more bytes. In this case, STUFFI may have a value of 1 because the stuffing field exists. The stuffing field may have a stuffing field header of 2 bytes. The first bit of the first byte of the stuffing field header is a STUFF_ONE field and may have a value of 0 because the size of the stuffing field is greater than 1 byte. The second and third bits of the first byte of the stuffing field header may be the above-described STUFF_TYPE field. Since only stuffing data exists in the stuffing data region of the BB frame, STUFF_TYPE may have a value of 00 as described above. FIG. 21 illustrates that STUFF_TYPE has a value of 11 according to another embodiment. That is, in this case, the value 11 of the STUFF_TYPE field may indicate that only stuffing data exists in the stuffing data region of the BB frame. STUFF_LEN_MSB and STUFF_LEN_LSB of the stuffing field header next to STUFF_TYPE may have length information of the stuffing field. The length of the stuffing field may be indicated using a total of 13 bits as described above. The stuffing data region may be located next to STUFF_LEN_MSB and STUFF_LEN_LSB. In this case, the stuffing data region may include the stuffing data only.

Case #4 may be a case in which a stuffing field having a size greater than 1 byte exists and in-band A signaling also exists in the BB frame. Here, stuffing data and the in-band A signaling may exist in the stuffing data region of the BB frame. The in-band A signaling may refer to the above-described specific-type in-band signaling. In this case, STUFFI may have a value of 1 because the stuffing field exists. The first bit of the first byte of the stuffing field header is a STUFF_ONE field and may have a value of 0 because the size of the stuffing field is greater than 1 byte. The second and third bits of the first byte of the stuffing field header may be the above-described STUFF_TYPE field. Since the in-band A signaling exists in the stuffing data region of the BB frame, STUFF_TYPE may have a value of 10 as described above. This value may be 01 according to another embodiment. STUFF_LEN_MSB and STUFF_LEN_LSB of the stuffing field header next to STUFF_TYPE may have length information of the stuffing field. The length of the stuffing field may be indicated using a total of 13 bits as described above. The stuffing data region may be located next to STUFF_LEN_MSB and STUFF_LEN_LSB. In this case, the stuffing data region may include the in-band A signaling in addition to the stuffing data.

Case #5 may be a case in which a stuffing field having a size greater than 1 byte exists and in-band B signaling also exists in the BB frame. Here, stuffing data and the in-band B signaling may exist in the stuffing data region of the BB frame. The in-band B signaling may refer to the above-described other-type in-band signaling. In this case, STUFFI may have a value of 1 because the stuffing field exists. The first bit of the first byte of the stuffing field header is a STUFF_ONE field and may have a value of 0 because the size of the stuffing field is greater than 1 byte. The second and third bits of the first byte of the stuffing field header may be the above-described STUFF_TYPE field. Since the in-band B signaling exists in the stuffing data region of the BB frame, STUFF_TYPE may have a value of 01 as described above. This value may be 10 according to another embodiment. STUFF_LEN_MSB and STUFF_LEN_LSB of the stuffing field header next to STUFF_TYPE may have length information of the stuffing field. The length of the stuffing field may be indicated using a total of 13 bits as described above. The stuffing data region may be located next to STUFF_LEN_MSB and STUFF_LEN_LSB. In this case, the stuffing data region may include the in-band B signaling in addition to the stuffing data.

Case #6 may be a case in which a stuffing field having a size greater than 1 byte exists and in-band A signaling and in-band B signaling also exist in the BB frame. Here, stuffing data and both the in-band A signaling and the in-band B signaling may exist in the stuffing data region of the BB frame. In this case, STUFFI may have a value of 1. The first bit of the first byte of the stuffing field header is a STUFF_ONE field and may have a value of 0 because the size of the stuffing field is greater than 1 byte. The second and third bits of the first byte of the stuffing field header may be the above-described STUFF_TYPE field. Since the in-band A signaling and the in-band B signaling exist in the stuffing data region of the BB frame, STUFF_TYPE may have a value of 11 as described above. FIG. 21 illustrates that STUFF_TYPE has a value of 00 according to another embodiment. That is, in this case, the value 00 of the STUFF_TYPE field may indicate that in-band A signaling and in-band B signaling exist in the stuffing data region. STUFF_LEN_MSB and STUFF_LEN_LSB of the stuffing field header next to STUFF_TYPE may have length information of the stuffing field. The length of the stuffing field may be indicated using a total of 13 bits as described above. The stuffing data region may be located next to STUFF_LEN_MSB and STUFF_LEN_LSB. In this case, the stuffing data region may include the in-band A signaling and the in-band B signaling in addition to the stuffing data.

Figure 22:
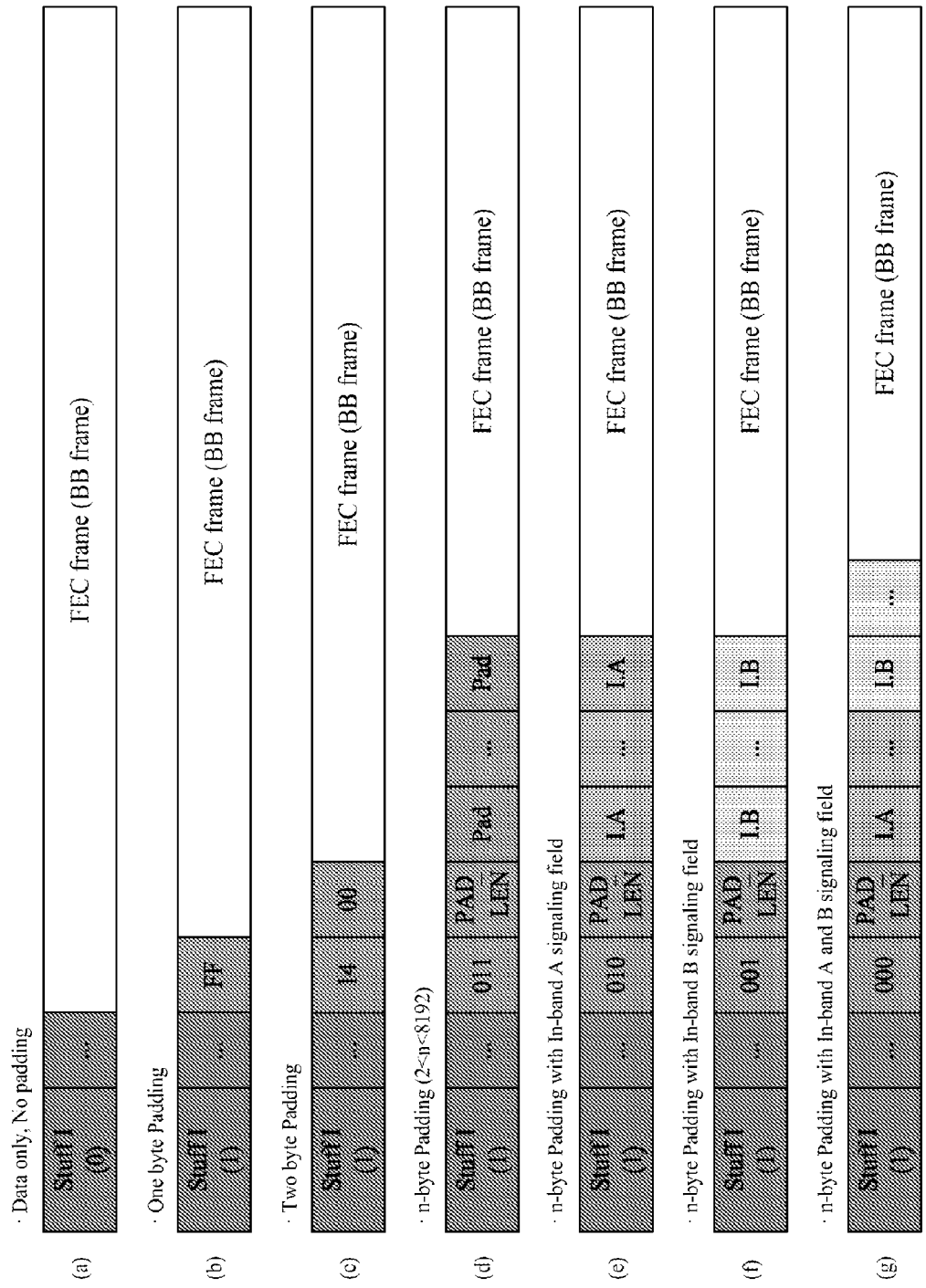
FIG. 22 is a view illustrating BB frames configured using the BB frame configuration method according to an embodiment of the present invention.

FIG. 22 is a view illustrating BB frames configured using the BB frame configuration method according to an embodiment of the present invention.

FIG. 22(a) may correspond to a case in which a BB frame includes data only with no padding, i.e., stuffing data. STUFFI of a BB frame header may have a value of 0. A payload is located immediately next to the BB frame header without locating a stuffing field therebetween. This may correspond to the above-described Case #1.

FIG. 22(b) may correspond to a case in which a BB frame includes 1 byte of padding. In this case, STUFFI of a BB frame header may have a value of 1. The first bit of the first byte thereof is STUFF_ONE and may have a value of 1. This may indicate that padding is 1 byte. In FIG. 22(b), the padding may have a value of 11111111 (0xFF). As described above, the padding may have a value of 10000000 according to another embodiment. This may correspond to the above-described Case #2.

FIG. 22(c) may correspond to a case in which a BB frame includes 2 bytes of padding. In this case, STUFFI of a BB frame header may have a value of 1. Here, STUFF_ONE may have a value of 0. STUFF_TYPE may indicate that in-band signaling is not used and only stuffing data is used. That is, according to an embodiment, STUFF_TYPE may have a value of 00. The remaining 13 bits may indicate that the length of a stuffing field is 2 bytes. These 13 bits may be STUFF_LEN_MSB and STUFF_LEN_LSB. According to another embodiment, STUFF_LEN_MSB and STUFF_LEN_LSB may not be used and the stuffing data may be located immediately next to STUFF_TYPE. This may correspond to the above-described Case #3 and, more particularly, a case in which the stuffing field is 2 bytes.

FIG. 22(d) may correspond to a case in which a BB frame includes n bytes of padding. In this case, STUFFI of a BB frame header may have a value of 1. Here, STUFF_ONE may have a value of 0. STUFF_TYPE may indicate that in-band signaling is not used and only stuffing data is used. That is, according to an embodiment, STUFF_TYPE may have a value of 00. The remaining 13 bits may indicate that the length of a stuffing field is n bytes. These 13 bits may be STUFF_LEN_MSB and STUFF_LEN_LSB. The stuffing data may be located next to STUFF_LEN_MSB and STUF- F_LEN_LSB. This may correspond to the above-described Case #3 and, more particularly, a case in which the stuffing field is 3 or more bytes.

FIG. 22(e) may correspond to a case in which a BB frame includes n bytes of padding with in-band A signaling. In this case, STUFFI of a BB frame header may have a value of 1. Here, STUFF_ONE may have a value of 0. STUFF_TYPE may indicate that the in-band A signaling is used. That is, according to an embodiment, STUFF_TYPE may have a value of 01. The value itself of STUFF_TYPE may be changed as described above. The remaining 13 bits may indicate that the length of a stuffing field is n bytes. These 13 bits may be STUFF_LEN_MSB and STUFF_LEN_LSB. The in-band A signaling data may be located next to STUF- A line marked MH shows overhead of the above-described other related art. MH may refer to the Mobile/Handheld DTV system standards of the Consumer Electronics Association (CEA). As such, the line marked MH shows overhead of a BB frame configured according to the above technical standards.

A line marked SS&SN shows overhead of the above-described still other related art. SS&SN may refer to one of related arts. Overhead of a BB frame and a BB frame header configured according to a method of this related art is shown as the line marked SS&SN.

Table 1 shows a result of comparing overheads of various BB frame configuration methods.

TABLE 1

| | | FEC | | | | | | | | | | |
|---|---|---|---|---|---|---|---|---|---|---|---|---|
| | | 64 k | | | | | | 16 k | | | | |
| CR | | 5/6 | 4/5 | 3/4 | 2/3 | 3/5 | 1/2 | 5/6 | 4/5 | 3/4 | 2/3 | 3/5 | 1/2 |
| kBCH | | 53840 | 51648 | 48408 | 43040 | 38688 | 32208 | 13152 | 12600 | 11880 | 10800 | 9720 | 7200 |
| DVB-T2 | | 0.0297 | 0.0310 | 0.0331 | 0.0372 | 0.0414 | 0.0497 | 0.1217 | 0.1270 | 0.1347 | 0.1481 | 0.1646 | 0.2222 |
| MH | | 0.0019 | 0.0019 | 0.0021 | 0.0023 | 0.0026 | 0.0031 | 0.0076 | 0.0079 | 0.0084 | 0.0093 | 0.0103 | 0.0139 |
| SS&SN | | 0.0037 | 0.0039 | 0.0041 | 0.0046 | 0.0052 | 0.0062 | 0.0152 | 0.0159 | 0.0168 | 0.0185 | 0.0206 | 0.0278 |
| LG | | 0.0019 | 0.0019 | 0.0021 | 0.0023 | 0.0026 | 0.0031 | 0.0076 | 0.0079 | 0.0084 | 0.0093 | 0.0103 | 0.0139 |

F_LEN_MSB and STUFF_LEN_LSB. This may correspond to the above-described Case #4.

FIG. 22(f) may correspond to a case in which a BB frame includes n bytes of padding with in-band B signaling. In this case, STUFFI of a BB frame header may have a value of 1. Here, STUFF_ONE may have a value of 0. STUFF_TYPE may indicate that the in-band B signaling is used. That is, according to an embodiment, STUFF_TYPE may have a value of 10. The value itself of STUFF_TYPE may be changed as described above. The remaining 13 bits may indicate that the length of a stuffing field is n bytes. These 13 bits may be STUFF_LEN_MSB and STUFF_LEN_LSB. The in-band B signaling data may be located next to STUFF_LEN_MSB and STUFF_LEN_LSB. This may correspond to the above-described Case #5.

FIG. 22(g) may correspond to a case in which a BB frame includes n bytes of padding with in-band A signaling and in-band B signaling. In this case, STUFFI of a BB frame header may have a value of 1. Here, STUFF_ONE may have a value of 0. STUFF_TYPE may indicate that both the in-band A signaling and the in-band B signaling are used. That is, according to an embodiment, STUFF_TYPE may have a value of 11. The value itself of STUFF_TYPE may be changed as described above. The remaining 13 bits may indicate that the length of a stuffing field is n bytes. These 13 bits may be STUFF_LEN_MSB and STUFF_LEN_LSB. The in-band A signaling data and the in-band B signaling data may be located next to STUFF_LEN_MSB and STUFF_LEN_LSB. This may correspond to the above-described Case #6.

Figure 23:
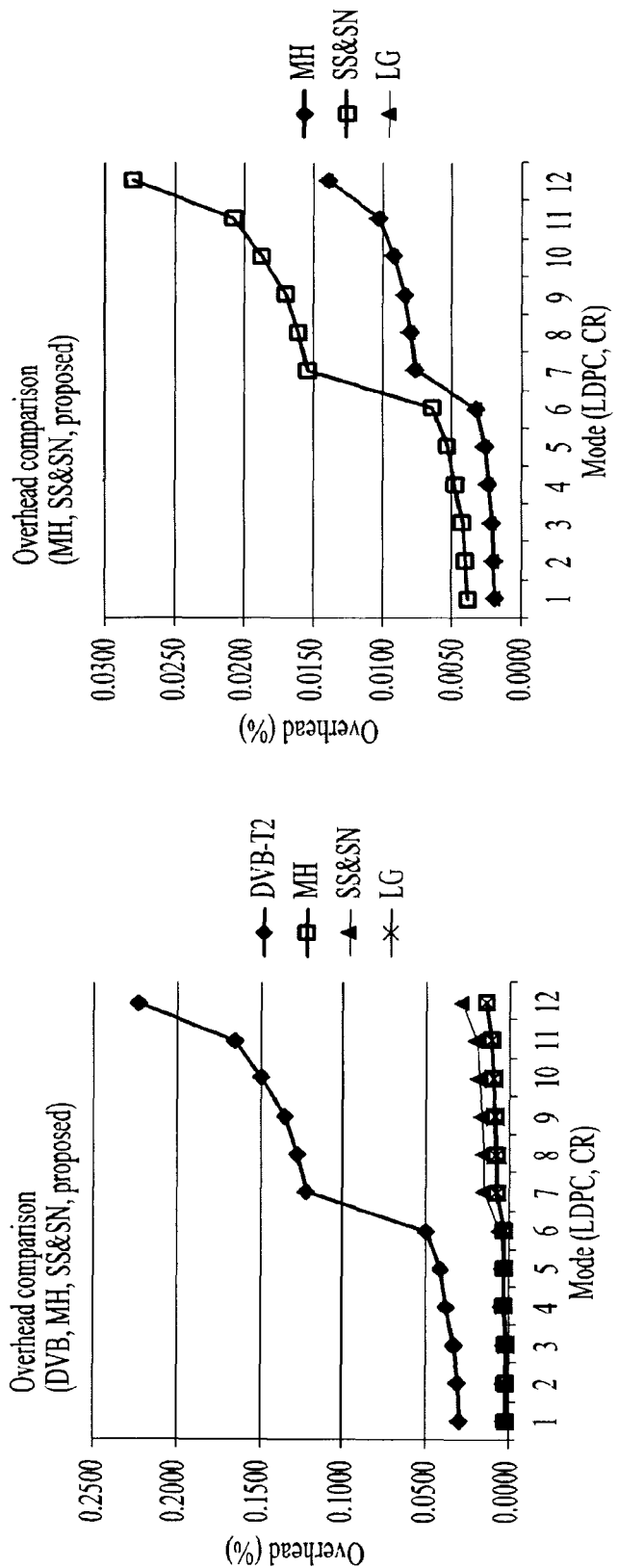
FIG. 23 is a view illustrating a result of comparing overheads of various BB frame configuration methods.

FIG. 23 is a view illustrating a result of comparing overheads of various BB frame configuration methods.

A line marked DVB-T2 shows overhead of the above-described related art. DVB-T2 may refer to the terrestrial television broadcasting system standards of Digital Video Broadcasting (DVB). DVB-T2 may also refer to the next-generation terrestrial broadcasting standards of Europe. As such, the line marked DVB-T2 shows overhead of a BB frame configured according to the above technical standards.

The overhead may refer to overhead of a field indicating the length of a data field.

The related art uses a 2-byte field in every BB frame and thus may have overhead up to 0.22%.

The other related art uses only a 1-bit field and thus may have overhead up to 0.0139%. This value may be the lowest value.

The still other related art may use a 2-bit field. In this case, overhead may be doubled compared to the other related art.

A line marked LG shows overhead according to the present invention. In the present invention, only a 1-bit field may be used for signaling of a stuffing field. Accordingly, overhead may be minimized. Further, an extra 2-bit field may be additionally prepared and used to indicate the type of in-band signaling. The present invention may use this extra field for another purpose, e.g., to indicate the configuration of a BB frame.

Figure 24:
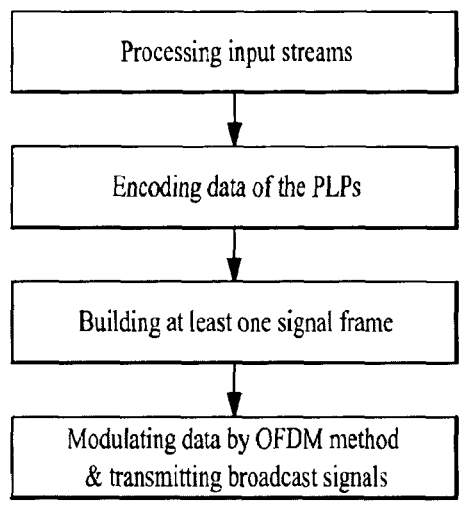
FIG. 24 illustrates a method of transmitting broadcast signal according to an embodiment of the present invention.

FIG. 24 illustrates a method of transmitting broadcast signal according to an embodiment of the present invention.

The method includes processing input streams, encoding data of the PLPs (Physical Layer Pipes)s, building at least one signal frame, and/or modulating data by OFDM method & transmitting broadcast signals.

In step of processing input streams, the above described input formatting module may process input streams. The input formatting module can process input streams into BB (Base Band) frames in PLPs. The PLP can be divided into BB frames. The input formatting module can demultiplex input streams into PLPs.

In step of encoding data of the PLPs, the above described coding & modulation module may encode data of the PLPs. The PLP can be also referred to as DP. This step can include LDPC (Low Density Parity Check) encoding, bit interleaving, mapping onto constellations, MIMO (Multi Input Multi Output) encoding, and/or time interleaving. The data in each data path can be encoded based on a code rate.

In step of building at least one signal frame, the above-described frame structure module can build signal frames by mapping the encoded data of the PLPs.

In step of modulating data by OFDM method & transmitting broadcast signals, the above-described waveform generation module can modulate data in OFDM method, and transmit the broadcast signals.

In this embodiment, at least one of the BB frames may include a stuffing field and a first indicator describing whether the stuffing field is included in the BB frame. The stuffing field is described above. The first indicator may refer to STUFFI field described above. The first indicator may refer to some other fields in the BB frame depends on embodiments.

In a method of transmitting broadcast signals according to other embodiment of the present invention, the step of processing input streams further includes, generating data fields of the BB frames by using the input streams, and inserting BB frame headers to the BB frames. This process may be conducted by the input formatting module. By generating data fields and inserting BB frame headers, the BB frame can be generated by using the input streams.

In a method of transmitting broadcast signals according to another embodiment of the present invention, the BB frame further includes a second indicator indicating length of the stuffing field. The second indicator may refer to STUFF_LEN_MSB and/or STUFF_LEN_LSB. These fields may indicates the length of the stuffing field. The second indicator may refer to some other fields in the BB frame depends on embodiments.

In a method of transmitting broadcast signals according to another embodiment of the present invention, the BB frame further includes a third indicator having information about composition of the BB frame. The third indicator may refer to STUFF_TYPE field. The third indicator may refer to some other fields in the BB frame depends on embodiments.

In a method of transmitting broadcast signals according to another embodiment of the present invention, the information in the third indicator indicates a type of stuffing data in the stuffing field. The third indicator may refer to STUFF_TYPE field. The third indicator may refer to some other fields in the BB frame depends on embodiments. The information in the STUFF_TYPE field is described above.

In a method of transmitting broadcast signals according to another embodiment of the present invention, the step of the encoding data of the PLPs further includes, encoding the BB frames in the PLPs with LDPC (Low Density Parity Check) codes, bit interleaving the LDPC encoded data in the PLPs, mapping the bit interleaved data onto constellations, MIMO (Multi Input Multi Output) encoding the mapped data, and/or time interleaving the MIMO encoded data.

The encoding with LDPC codes may correspond to LDPC encoding by LDPC encoder. The LDPC encoder may encode BB frames in the PLPs with LDPC codes. Bit interleaving may correspond to bit interleaving by bit interleaver. Constellation mapping may correspond to the constellation mapping conducted by constellation mapper. MIMO encoding can refer to MIMO encoding performed by above described MIMO encoder. Time interleaving can correspond to time interleaving by time interleaver.

The above-described steps can be omitted or replaced by steps executing similar or identical functions according to design.

Figure 25:
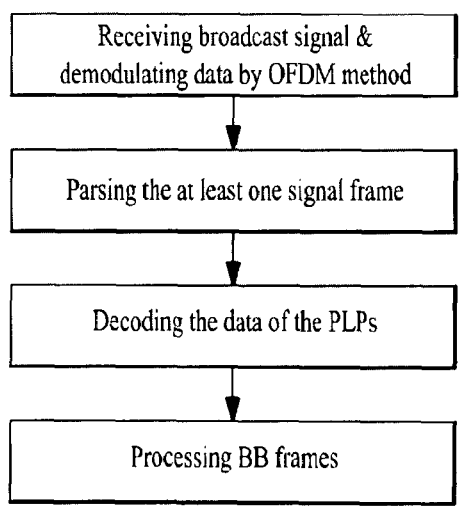
FIG. 25 illustrates a method of receiving broadcast signal according to an embodiment of the present invention.

FIG. 25 illustrates a method of receiving broadcast signal according to an embodiment of the present invention.

The method includes receiving broadcast signals & demodulating data by OFDM method, parsing the at least one signal frame, decoding the data of the PLPs, and/or processing BB frames.

In step of receiving broadcast signals & demodulating data by OFDM method, the above-described synchronization & demodulation module receives broadcast signals, and demodulates data by OFDM method.

In step of parsing the at least one signal frame, the above-described frame parsing module parses the signal frame by demapping data of the PLPs.

In step of decoding the data of the PLPs, the above-described demapping & decoding module decodes the PLP data. Step of decoding the PLP data can include time deinterleaving, MIMO (Multi Input Multi Output) decoding, and so on.

In step of processing BB frames, the above described output processor may conduct output processing on the BB frames in the PLPs. The output processor may output streams.

In this embodiment, at least one of the BB frames may include a stuffing field and a first indicator describing whether the stuffing field is included in the BB frame. The stuffing field is described above. The first indicator may refer to STUFFI field described above. The first indicator may refer to some other fields in the BB frame depends on embodiments.

In a method of receiving broadcast signals according to other embodiment of the present invention, the step of the processing BB frames in the PLPs further includes, removing BB frame headers from the BB frames, and/or generating output streams by using data fields of the BB frames. By removing BB frame headers and generating output streams from the BB frames, output streams can be outputted.

In a method of receiving broadcast signals according to another embodiment of the present invention, the BB frame further includes a second indicator indicating length of the stuffing field. The second indicator may refer to STUFF_LEN_MSB and/or STUFF_LEN_LSB. These fields may indicates the length of the stuffing field. The second indicator may refer to some other fields in the BB frame depends on embodiments.

In a method of receiving broadcast signals according to another embodiment of the present invention, the BB frame further includes a third indicator having information about composition of the BB frame. The third indicator may refer to STUFF_TYPE field. The third indicator may refer to some other fields in the BB frame depends on embodiments.

In a method of receiving broadcast signals according to another embodiment of the present invention, the information in the third indicator indicates a type of stuffing data in the stuffing field. The third indicator may refer to STUFF_TYPE field. The third indicator may refer to some other fields in the BB frame depends on embodiments. The information in the STUFF_TYPE field is described above.

In a method of receiving broadcast signals according to another embodiment of the present invention, the decoding the data of the PLPs further includes, time deinterleaving the data of the PLPs, MIMO (Multi Input Multi Output) decoding the time deinterleaved data of the PLPs, demapping the MIMO decoded data from constellations, bit deinterleaving the demapped data, and/or processing the bit deinterleaved data with LDPC (Low Density Parity Check) codes to output BB frames.

In step of time deinterleaving, the above-described time deinterleaver can conduct time deinterleaving PLP data. In step of MIMO decoding, the above-described MIMO decoder can conduct MIMO decoding PLP data. MIMO decoding can be conducted by using MIMO matrix including MIMO coefficient. MIMO coefficient can be used for adjusting power imbalance. In step of demapping from constellations, the above-described constellation demapper can conduct demapping. The demapping can be conducted on PLP data. In step of bit deinterleaving, the above-described bit deinterleaver can conduct bit deinterleaving. In step of LDPC decoding. the above-described LDPC decoder (or FEC decoder) can decode PLP data according to LDPC code, to output BB frames.

The above-described steps can be omitted or replaced by steps executing similar or identical functions according to design.

Although the description of the present invention is explained with reference to each of the accompanying drawings for clarity, it is possible to design new embodiment(s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. And, the embodiments mentioned in the foregoing description can be configured in a manner of being selectively combined with one another entirely or in part to enable various modifications.

In addition, a method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

Various embodiments have been described in the best mode for carrying out the invention.

The present invention has industrial applicability in broadcasting and communication field.

What is claimed is:

1. A method of transmitting broadcast signals, the method comprising:
   processing input streams into PLPs (Physical Layer Pipes), wherein the processing input streams includes:
   mapping data in the input streams to payloads of BB (Base Band) packets of the PLPs, wherein at least one BB packet includes a base part, an optional part, and an extension part;
   encoding data of the PLPs with LDPC (Low Density Parity Check) codes;
   building at least one signal frame by mapping the encoded data of the PLPs;
   modulating data in the built signal frame by OFDM (Orthogonal Frequency Division Multiplexing) method; and
   transmitting the broadcast signals having the modulated data,
   wherein the base part includes information indicating presence of the optional part,
   wherein the optional part includes type information and length information,
   wherein the type information indicates a type of the extension part,
   wherein the length information indicates a length of the extension part,
   wherein the length information comprises a concatenation of a least significant bit (LSB) field and a most significant bit (MSB) field, and
   wherein the type information indicates whether the extension part includes padding data or not.

2. The method of claim 1, wherein the extension part further includes additional data which includes a count information counting the each BB packet of a corresponding PLP.

3. The method of claim 1, wherein the optional header has length of either 1 or 2 bytes.

4. The method of claim 1, wherein the length information is 13 bits and indicates the length of the extension part in range 0 bytes to end of the BB packet,
   wherein the optional part has a length of 2 bytes, and
   wherein the BB packets have fixed length which is determined based on parameters chosen for a corresponding PLP.

5. The method of claim 1, wherein the LDPC codes have length of either 16200 bits or 64800 bits.

6. The method of claim 1, wherein the processing input streams further includes:
   deleting null packets from the input streams, and
   compressing input headers of input packets in the input streams by deleting identical information in the input headers.

7. An apparatus for transmitting broadcast signals, the apparatus comprising:
   an input processing module that processes input streams into PLPs (Physical Layer Pipes),
   wherein the input processing module maps data in the input streams to payloads of BB (Base Band) packets of the PLPs, and
   wherein at least one BB packet includes a base part, an optional part, and an extension part;
   an encoding module that encodes data of the PLPs with LDPC (Low Density Parity Check) codes;
   a frame building module that builds at least one signal frame by mapping the encoded data of the PLPs; and
   a modulating module that modulates data in the built signal frame by OFDM (Orthogonal Frequency Division Multiplexing) method and that transmits the broadcast signals having the modulated data,
   wherein the header includes a base part, an optional part, and an extension part,
   wherein the base part includes information indicating presence of the optional part,
   wherein the optional part includes type information and length information,
   wherein the type information indicates a type of the extension part, wherein the length information indicates a length of the extension part, wherein the length information comprises a concatenation of a least significant bit (LSB) field and a most significant bit (MSB) field, and wherein the type information indicates whether the extension part includes padding data or not.

8. The apparatus of claim 7, wherein the extension part further includes additional data which includes a count information counting the each BB packet of a corresponding PLP.

9. The apparatus of claim 7, wherein the optional header has length of either 1 or 2 bytes.

10. The apparatus of claim 7, wherein the length information is 13 bits and indicates the length of the extension part in range 0 bytes to end of the BB packet, wherein the optional part has a length of 2 bytes, and wherein the BB packets have fixed length which is determined based on parameters chosen for a corresponding PLP.

11. The apparatus of claim 7, wherein the LDPC codes have a length of either 16200 bits or 64800 bits.

12. The apparatus of claim 7, wherein the input processing module deletes null packets from the input streams, and compresses input headers of input packets in the input streams by deleting identical information in the input headers.

* * * * *